United States Patent
Yamasaki et al.

(10) Patent No.: US 6,824,684 B2
(45) Date of Patent: Nov. 30, 2004

(54) WASTEWATER TREATMENT METHOD AND APPARATUS

(75) Inventors: Kazuyuki Yamasaki, Hiroshima (JP); Kazumi Chujo, Kagawa-ken (JP)

(73) Assignee: Sharp Kabushiki Kaisha, Osaka (JP)

(*) Notice: Subject to any disclaimer, the term of this patent is extended or adjusted under 35 U.S.C. 154(b) by 106 days.

(21) Appl. No.: 10/287,807

(22) Filed: Nov. 5, 2002

(65) Prior Publication Data

US 2003/0085172 A1 May 8, 2003

(30) Foreign Application Priority Data

Nov. 6, 2001 (JP) .......................... 2001-340349

(51) Int. Cl.⁷ .............................. C02F 3/06; C02F 3/12
(52) U.S. Cl. ....................... 210/625; 210/626; 210/628; 210/650
(58) Field of Search .................. 210/624, 625, 210/626, 628, 631, 650

(56) References Cited

U.S. PATENT DOCUMENTS

| 4,452,699 A | * | 6/1984 | Suzuki et al. ............... 210/608 |
| 5,578,214 A | | 11/1996 | Yamasaki et al. |
| 5,702,604 A | | 12/1997 | Yamasaki et al. |

FOREIGN PATENT DOCUMENTS

| JP | 64-060371 | 3/1989 |
| JP | 64-063372 | 3/1989 |
| JP | 01-135595 | 5/1989 |
| JP | 01-148398 | 6/1989 |
| JP | 02-072864 | 3/1990 |
| JP | 02-072865 | 3/1990 |
| JP | 03-217298 | 9/1991 |
| JP | 05-064796 | 3/1993 |
| JP | 05-064797 | 3/1993 |
| JP | 05-269488 | 10/1993 |
| JP | 08-099092 | 4/1996 |
| JP | 09-070599 | 3/1997 |

* cited by examiner

Primary Examiner—Robert A. Hopkins
(74) Attorney, Agent, or Firm—Nixon & Vanderhye P.C.

(57) ABSTRACT

According to this wastewater treatment apparatus, wastewater can be treated by novel action by a foaming tank 7 in comparison with a treatment method solely using a biological treatment tank 1 constituting an aeration tank. That is, wastewater can be treated by action achieved by combining (1) action solely of a biological treatment tank 1 and (2) action of a foaming tank 7. Specific action in this foaming tank 7 includes supply of dissolved oxygen to wastewater and oxidation by bubbled air (micro air) under a favorable condition with a shallow water depth. According to this wastewater treatment apparatus, energy to be consumed can be saved and toxic chemical substances such as dimethylformamide as a toxic chemical substance can be completely decomposed by unlimited microorganisms.

20 Claims, 18 Drawing Sheets

WASTEWATER TREATMENT METHOD AND APPARATUS

BACKGROUND OF THE INVENTION

The present invention relates to a wastewater treatment method and apparatus. For example, the present invention relates to an energy-saving wastewater treatment method and apparatus by which wastewater containing dimethylformamide, which is a toxic chemical substance, can be completely decomposed by using microorganisms. Further, the present invention relates to a wastewater treatment method and apparatus using a biological treatment tank having a submerged membrane and a foaming tank in combination.

Since the PRTR (Pollutant Release and Transfer Register) Law (the Law Concerning Reporting, etc. of Releases to the Environment of Specific Chemical Substances and Promoting Improvements in Their Management) came into operation in April 2001, much attention has been paid to the amount of releases of toxic chemical substances to environment.

Furthermore, today, when addressing to global environment is the most important issue, energy saving in wastewater treatment equipment is also an important theme.

Against such a backdrop, dimethylformamide used in a semiconductor factory has been designated as a toxic chemical substance (Class-1 designated chemical substance) by the PRTR Law, and thus thorough control and reduction of an amount of dimethylformamide release are being required. Wastewater containing dimethylformamide has been conventionally subjected to incineration due to its biological toxicity. In the case of incineration, however, a system with low environmental load cannot be provided since heavy oil or the like is used as an incineration fuel and wastewater needs to be transported to an incineration plant.

Furthermore, as a conventional technique, the technique described in Japanese Patent Laid-Open Publication No. 8-99092 has been proposed. This conventional technique relates to a wastewater treatment apparatus in which wastewater containing high-concentration organic matter is treated by increasing a microorganism concentration. That is, a vinylidene-chloride filler and a submerged membrane (referred to as a membrane filter) are installed in a catalytic oxidation tank as a bioreactor, and wastewater is treated by increasing the microorganism concentration. In this technique, however, no energy saving measure is taken. Specifically, no energy saving measure is taken for a blower, which has high power consumption as equipment. Furthermore, it is not disclosed in this technique that dimethylformamide as a toxic substance can be completely decomposed by a catalytic oxidation tank maintaining a high concentration of microorganisms.

Furthermore, as another conventional technique, the technique described in Japanese Patent Laid-Open Publication No. 9-70599 has been proposed. This conventional technique also relates to a wastewater treatment apparatus in which wastewater containing high-concentration organic matter is treated by increasing a microorganism concentration as in the case of the aforementioned apparatus described in Japanese Patent Laid-Open Publication No. 8-99092. In this conventional technique, a vinylidene-chloride filler and a submerged membrane (referred to as a membrane filter) are installed in a catalytic oxidation tank as a bioreactor, and wastewater is treated by increasing the microorganism concentration. However, no energy saving measure is taken in this technique, either. Specifically, no energy saving measure is taken for a blower, which has high power consumption as equipment. Furthermore, it is not disclosed that dimethylformamide as a toxic substance can be completely decomposed by a catalytic oxidation tank maintaining a high concentration of microorganisms.

Furthermore, a wastewater treatment apparatus shown in FIG. 16 can be mentioned as another conventional technique. In this FIG. 16, reference numeral 101 denotes an aeration tank, in which microorganisms are propagated, and wastewater is introduced thereinto. In this aeration tank 101, air supplied from a blower 102 is discharged from a diffusing pipe 103 to perform aeration by agitation in the aeration tank 101, and thus oxygen in the air is supplied into the aeration tank 101. Consequently, aerobic microorganisms are propagated in the aeration tank 101 to treat organic matter.

Subsequently, the wastewater biologically treated in this aeration tank 101 is introduced into a sedimentation tank 104 and separated into a solid and a liquid by sedimentation. The sedimentation tank 104 is equipped with a gathering device 105 and a sludge returning pump 106 for returning sludge sedimented in the sedimentation tank 104 to the aeration tank 101. This sludge from the sludge returning pump 106 is partly dehydrated in a sludge treatment process. Electrical energy for operating the blower 102 is required in this wastewater treatment apparatus, but no rational energy saving method has been provided for this energy consumption.

Furthermore, a wastewater treatment apparatus shown in FIG. 17 can be mentioned as another conventional technique. In FIG. 17, reference numeral 110 denotes a catalytic oxidation tank, in which microorganisms are propagated and a filler 109 is filled, and wastewater is introduced thereinto. In this catalytic oxidation tank 110, air supplied from a blower 102 is discharged from a diffusing pipe 103 to perform contact aeration by agitation in the catalytic oxidation tank 110, and thus oxygen from the air is supplied into the catalytic oxidation tank 110. Consequently, organic matter is treated by propagating aerobic microorganisms in the catalytic oxidation tank 110.

Subsequently, the wastewater biologically treated in this catalytic oxidation tank 110 is introduced into a sedimentation tank 104 and separated into a solid and a liquid by sedimentation. This sedimentation tank 104 is equipped with a gathering device 105 and a sludge returning pump 106 for returning sludge sedimented in the sedimentation tank 104 to the catalytic oxidation tank 110. This sludge from the sludge returning pump 106 is partly dehydrated in a sludge treatment process. Electrical energy for operating the blower 102 is also required in this wastewater treatment apparatus, but no rational energy saving method has been provided for this energy consumption of the blower 102.

Furthermore, as another conventional technique, a wastewater treatment apparatus shown in FIG. 18 has been proposed. In FIG. 18, reference numeral 115 denotes a rotating disc tank, in which microorganisms are propagated, and wastewater is introduced thereinto. In this rotating disc tank 115, a rotating disc 117 is driven by a motor 116 to be rotationally moved in water and air. Consequently, oxygen is supplied, and thus organic matter is treated by propagating aerobic microorganisms on a surface of the disc 117.

Subsequently, the wastewater biologically treated in this rotating disc tank 115 is introduced into a sedimentation tank 104 and separated into a solid and a liquid by sedimentation. This sedimentation tank 104 is equipped with a gathering device 105 and a sludge returning pump 106 for returning sludge sedimented in the sedimentation tank 104 to the rotating disc tank 115. This sludge from the sludge returning pump 106 is partly dehydrated in a sludge treatment process. Electrical energy for driving the rotating disc 117 is also required in this wastewater treatment apparatus, but there has been provided no wastewater treatment apparatus with which initial costs can be reduced and energy saving can be achieved.

Furthermore, examples of other conventional techniques include those described in Japanese Patent Laid-Open Publication Nos. 1-60371, 1-63372, 1-135595, 1-148398, 2-72864, 2-72865, 3-217298, 5-64796, 5-64797 and 5-269488.

These conventional techniques all relate to a method of decomposing dimethylformamide by specific microorganisms. However, it is difficult to manage wastewater treatment equipment so as to culture specific microorganisms in a biological treatment tank, in which other various bacteria are mixed, and it is difficult to manage operations so as to maintain specific microorganisms for a continuous long time.

As described above, wastewater containing dimethylformamide as a toxic chemical substance is generally disposed by incineration, but a specific problem arises that incineration costs are high. Furthermore, in an era of conservation of global environment, a method of incinerating wastewater by using heavy oil is not regarded as an energy-saving disposal method. Furthermore, there is a decomposition method by specific microorganisms, but a problem arises that advanced technology is required for operation management or the like to culture only specific microorganisms due to influence of other various bacteria. That is, a method has been required in which wastewater is treated not by specifying microorganisms, but by using aggregation of various microorganisms such as activated sludge.

However, the activated sludge method is a treatment method using aggregation of various microorganisms, but a microorganism concentration in MLSS (Mixed Liquor Suspended Solid) is low at 3000–4000 ppm. Therefore, dimethylformamide as a toxic chemical substance cannot be completely decomposed. The microorganism concentration in MLSS in this activated sludge method is generally 3000–4000 ppm.

Conventionally, when wastewater containing dimethylformamide as a toxic chemical substance is treated, incineration has been performed since incineration is mentioned in a "Chemical Substance etc. Safety Data Sheet" of a chemical manufacturer, and complete decomposition of dimethylformamide has been impossible in a general microorganism treatment system.

Accordingly, an object of the present invention is to provide a wastewater treatment method and apparatus in which energy to be consumed can be saved and easy management can be achieved by completely decomposing toxic chemical substances such as dimethylformamide by using unlimited microorganisms.

SUMMARY OF THE INVENTION

In order to achieve the above object, there is provided a wastewater treatment method comprising steps of treating wastewater by introducing the wastewater into a biological treatment tank, introducing the treated water from the biological treatment tank into a sedimentation tank, separating sludge generated in this sedimentation tank by sedimentation, treating this sedimented sludge by introducing the sludge into a foaming tank having a function of generating air bubbles, and returning the sludge treated in the foaming tank to the biological treatment tank.

Also, there is provided a wastewater treatment apparatus comprising a biological treatment tank, in which wastewater is treated by organisms, a sedimentation tank, into which the treated water from the biological treatment tank is introduced and in which generated sludge is separated by sedimentation, and a foaming tank, into which the sludge sedimented in the sedimentation tank is introduced and which has a function of generating air bubbles and treats and returns the sludge to the biological treatment tank.

According to the wastewater treatment method of the present invention and a wastewater treatment apparatus of one embodiment, wastewater can be treated by novel action by a foaming tank in comparison with a treatment method solely using a biological treatment tank. That is, wastewater can be treated by action achieved by combining (1) sole action of the biological treatment tank and (2) action of the foaming tank. Specific action by this foaming tank includes a supply of dissolved oxygen to wastewater under a favorable condition in shallow water depth and oxidation by bubbled air (micro air).

For example, while the foaming tank has a water depth of about 1 m, the aeration tank has a water depth of about 4–5 m. When the water tank is deep, pressure loss of the blower is increased, and electric power consumption is increased.

In one embodiment of the present invention, the biological treatment tank is any one of an aeration tank, catalytic oxidation tank or rotating disc tank or a combination thereof.

In one embodiment of the present invention, the biological treatment tank is any one of an aeration tank, catalytic oxidation tank or rotating disc tank or a combination thereof.

According to the above embodiment, the biological treatment tank is any one of an aeration tank, catalytic oxidation tank or rotating disc tank or a combination thereof. Therefore, according to the above wastewater treatment apparatus and method, a novel effect by the foaming tank can be added to an effect obtained by solely using a conventional aeration tank, catalytic oxidation tank or rotating disc tank.

Here, an aeration tank and a catalytic oxidation tank are different in that a tank containing a filler to be brought in contact with wastewater is referred to as a catalytic oxidation tank and a tank without this filler is referred to as an aeration tank.

In one embodiment of the present invention, the wastewater is wastewater containing organic matter.

In the wastewater treatment method according to this embodiment, since the wastewater is wastewater containing organic matter, this organic matter can be treated by action achieved by combining (1) action of a sole biological treatment tank and (2) action of a foaming tank. Specifically, wastewater can be treated by a system in which (1) oxidation is performed by aerobic microorganisms in the biological treatment tank and (2) sufficient oxygen can be supplied to microorganisms with low electrical energy due to micro air in the foaming tank. That is, energy saving can be achieved.

Also, there is provided a wastewater treatment method comprising steps of introducing wastewater into a biological treatment tank equipped with a submerged membrane and treating the wastewater, introducing sludge generated in the biological treatment tank into a foaming tank having a function of generating bubbles and treating the sludge, and returning the sludge treated in the foaming tank to the biological treatment tank.

Also, there is provided a wastewater treatment apparatus which comprises a biological treatment tank having a submerged membrane, in which wastewater is treated by living organisms, and a foaming tank, into which sludge sedimented in the biological treatment tank is introduced and which has a function of generating air bubbles and treats and returns the sludge to the biological treatment tank.

In the wastewater treatment method and apparatus according to the above constitution, since a submerged membrane is installed in the biological treatment tank (for example, an aeration tank or catalytic oxidation tank), propagated microorganisms can be maintained in this biological treatment tank, and microorganisms can be concentrated to a high concentration by the submerged membrane.

Thus, since microorganisms can be concentrated to a high concentration by the submerged membrane, toxic chemical substances mainly including organic matter, which can be hardly treated by microorganisms conventionally, can be treated by microorganisms. This is because high-concentration microorganisms reduce influence of toxic chemical substances and hence the microorganisms have stronger ability to decompose the toxic chemical substances.

In one embodiment of the present invention, the wastewater is organic wastewater containing dimethylformamide.

According to the above wastewater treatment method, the wastewater is organic wastewater containing dimethylformamide. Therefore, dimethylformamide, a toxic chemical substance of which biological decomposition is relatively difficult, can be treated in an energy-saving manner by a biological treatment tank (for example, an aeration tank, catalytic oxidation tank or the like) having a submerged membrane and a foaming tank.

That is, when an operation for maintaining a high concentration of microorganisms by using the submerged membrane, organic wastewater containing dimethylformamide can be treated. Specifically, when an operation is performed so that the concentration in MLSS becomes 10000 ppm or higher, organic wastewater containing dimethylformamide can be treated.

At this time, a large amount of air is required, but, since micro air can be utilized to allow sludge to adhere to micro air and oxygen dissolution efficiency is improved by the micro air by using the foaming tank, organic wastewater containing dimethylformamide can be treated with low electrical energy. When a radial ring-shaped thread body is filled in a biological treatment tank, treatment of dimethylformamide is further stabilized and the treatment becomes more reliable.

In one embodiment of the present invention, the wastewater is organic wastewater containing dimethylformamide, ammonium fluoride and tetramethylammonium formade.

In the wastewater treatment method according to this embodiment, this mixed wastewater as a main component contains organic matter. Therefore, (1) dimethylformamide, (2) ammonium fluoride and (3) tetramethylammonium formade as toxic chemical substances, which are contained in wastewater actually discharged in a semiconductor factory and of which biological decomposition is relatively difficult, can be treated in an energy-saving manner by combination of an aeration tank or catalytic oxidation tank having a submerged membrane and a foaming tank.

In one embodiment of the present invention, the foaming tank is disposed above the biological treatment tank and has a foaming machine that rotates at a high speed so that an impeller generates bubbles.

According to the above embodiment, the foaming tank is disposed above the biological treatment tank. Therefore, since two water tanks (a foaming tank and a biological treatment tank) can be vertically disposed, an installation area can be saved and a space can be effectively utilized. Furthermore, wastewater which is introduced into the foaming tank is treated and then can be returned to the biological treatment tank (an aeration tank or catalytic oxidation tank) by gravity, which is useful for maintaining aerobicity. That is, micro air is returned to the original water tank without being separated from sludge.

Furthermore, since an impeller of a foaming machine rotates at a high speed, air is finely sheared and jetted into water, oxygen dissolution efficiency is improved, and a dissolved oxygen concentration in water can be increased. At the same time, air oxidation of organic matter contained in wastewater is accelerated by micro air.

In one embodiment of the present invention, an MLSS concentration of the returned sludge introduced into the foaming tank is 10000 ppm or higher.

In the wastewater treatment apparatus according to this embodiment, an MLSS (Mixed Liquor Suspended Solid) concentration of the returned sludge introduced into the foaming tank is made 10000 ppm or higher. Therefore, since the MLSS concentration in the biological treatment tank (for example, an aeration tank or catalytic oxidation tank) is 10000 ppm or higher, toxic chemical substances can be decomposed by an oxidizing ability of high-concentration aerobic microorganisms. Furthermore, it was found by experiments that air in the foaming tank became finer by making the MLSS concentration 10000 ppm or higher.

In one embodiment of the present invention, the biological treatment tank is an aeration tank or catalytic oxidation tank or a combination thereof, an upper portion of the aeration tank or catalytic oxidation tank is constituted by an aerobic portion, and a lower portion thereof is constituted by an anaerobic portion, and wastewater is introduced from the lower portion into the biological treatment tank and wastewater is circulated in the biological treatment tank.

According to the wastewater treatment apparatus of this embodiment, an aeration tank or catalytic oxidation tank constituting a biological treatment tank consists of an upper portion, which is an aerobic portion, and a lower portion, which is an anaerobic portion. Therefore, while sludge generated in the upper portion, which is an aerobic portion, is digested in the lower portion, which is an anaerobic portion, organic matter can be decomposed. Therefore, genesis sludge capacity can be reduced in comparison with aerobic treatment only in the aerobic portion. Furthermore, since there are an aerobic process and an anaerobic process, wastewater is introduced from the lower portion of the biological treatment tank, and wastewater is circulated in the biological treatment tank, denitrification can be expected.

In one embodiment of the present invention, a submerged membrane is installed in the upper portion of the aeration tank or catalytic oxidation tank, sludge transporting means is provided to introduce sludge in the anaerobic portion of the lower portion of the aeration tank or catalytic oxidation tank to the foaming tank, and sludge is introduced from the foaming tank into the aerobic portion of the upper portion of the aeration tank or catalytic oxidation tank.

According to the wastewater treatment apparatus of this embodiment, in an anaerobic portion, which is a lower portion of an aeration tank or catalytic oxidation tank, highly adhesive sludge is introduced into an aerobic foaming tank by sludge transporting means in a short time. Therefore, while anaerobicity is maintained inside the sludge, micro air can adhere to a sludge surface, the sludge surface remains aerobic, and the sludge can be returned to the aerobic portion of the original aeration tank or catalytic oxidation tank and then to the anaerobic portion, which is the lower portion.

That is, treatment ability of anaerobic microorganisms and that of aerobic microorganisms are maintained with low electrical energy, and the sludge can be returned to the lower portion (anaerobic portion) of the original aeration tank or catalytic oxidation tank. According to this wastewater treatment apparatus, since aeration requiring high electrical energy (destruction by a large amount of air) is not necessary, a sludge mass is hardly destroyed.

In one embodiment of the present invention, sludge introduced into the foaming tank is:

sludge generated in a final part of a treatment process in the aeration tank or catalytic oxidation tank constituting the biological treatment tank, and sludge from the foaming tank is introduced in an initial part of the treatment process in the aeration tank or catalytic oxidation tank.

According to the wastewater treatment apparatus of this embodiment, circulation in the whole aeration tank or catalytic oxidation tank can be made reliable, and a microorganism concentration in the tank can be averaged.

In one embodiment of the present invention, the biological treatment tank has at least a catalytic oxidation tank, a filler made of a radial ring form is filled in this catalytic oxidation tank, and the submerged membrane in the aeration tank or catalytic oxidation tank constituting the biological treatment tank is an ultrafiltration membrane.

According to the wastewater treatment apparatus of this embodiment, since a filler is a radial ring form (aggregates of fibrous rings), a large amount of microorganisms can be propagated and immobilized thereon, and, as a result, treatment water quality can be stabilized. Furthermore, since the submerged membrane is an ultrafiltration membrane, propagated microorganisms can be maintained in the aeration tank or catalytic oxidation tank at a high concentration by performance of the ultrafiltration membrane, and thus toxic chemical substances can be treated by the microorganisms.

In one embodiment of the present invention, a material of the radial ring-shaped thread body is at least one of polyvinylidene chloride, polypropylene or vinylon.

According to the wastewater treatment apparatus of this embodiment, the radial ring form has practical strength and is not worn out at the same time. The radial ring form also has chemical resistance, and thereby does not need to be replaced even after a long-term use. That is, the filler has a long life.

In one embodiment of the present invention, the wastewater is wastewater containing toxic chemical substances.

According to the wastewater treatment apparatus of this embodiment, even when wastewater is wastewater containing toxic chemical substances, the toxic chemical substances can be treated by a wastewater treatment system having a microorganism concentration increased by a submerged membrane. Furthermore, since the foaming tank allows micro air to adhere to sludge, air can be efficiently utilized. Therefore, wastewater can be treated with low electrical energy, and thus an energy-saving system can be provided.

In one embodiment of the present invention, the wastewater is mixture wastewater of wastewater containing dimethylformamide and wastewater containing a developer.

According to the wastewater treatment apparatus of this embodiment, since a wastewater treatment system is a wastewater treatment system having a microorganism concentration increased by a submerged membrane, various kinds of toxic chemical substances can be treated. Therefore, wastewater containing dimethylformamide and wastewater containing a developer, which are generated in a semiconductor factory, can be treated in one water tank, and hence initial costs can be reduced in comparison with a case where separate wastewater treatment apparatuses therefor are constructed.

In one embodiment of the present invention, development wastewater is organic wastewater containing tetramethylammonium hydroxide.

According to the wastewater treatment apparatus of this embodiment, wastewater containing dimethylformamide and wastewater containing a developer including tetramethylammonium hydroxide (TMAH) as a main component, which are generated in a semiconductor factory, can be treated in one water tank, and hence initial costs can be reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereafter, embodiments of the present invention are described in detail with reference to the accompanying drawings.

First Embodiment

Figure 1:
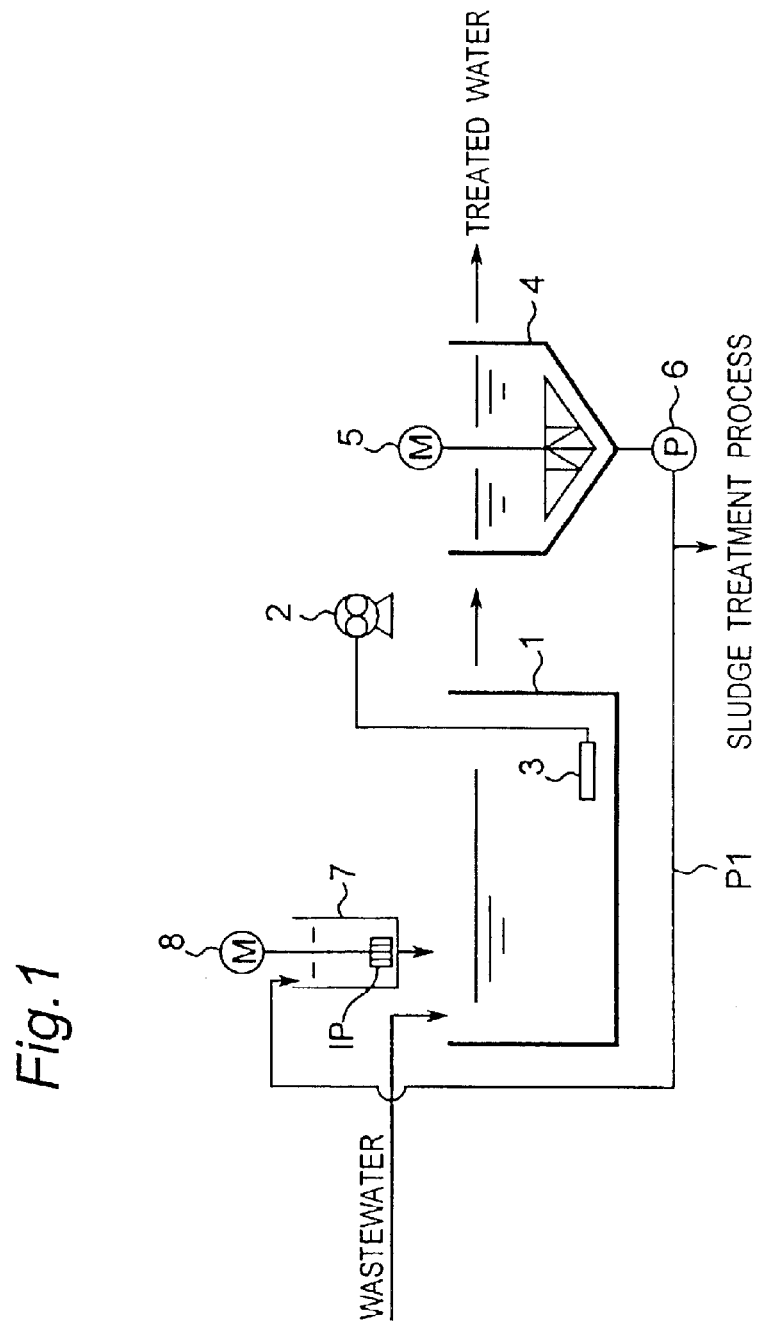
FIG. 1 is a block diagram showing a wastewater treatment apparatus according to a first embodiment of the invention.

FIG. 1 shows a configuration of a wastewater treatment apparatus according to a first embodiment of the invention. The first embodiment includes an aeration tank 1 as a biological treatment tank, a sedimentation tank 4 at a subsequent stage thereof and a foaming tank 7. This foaming tank 7 is disposed above the aeration tank 1, and sedimented sludge in the sedimentation tank 4 is returned thereto by a returning pipe P1.

Figure 16:
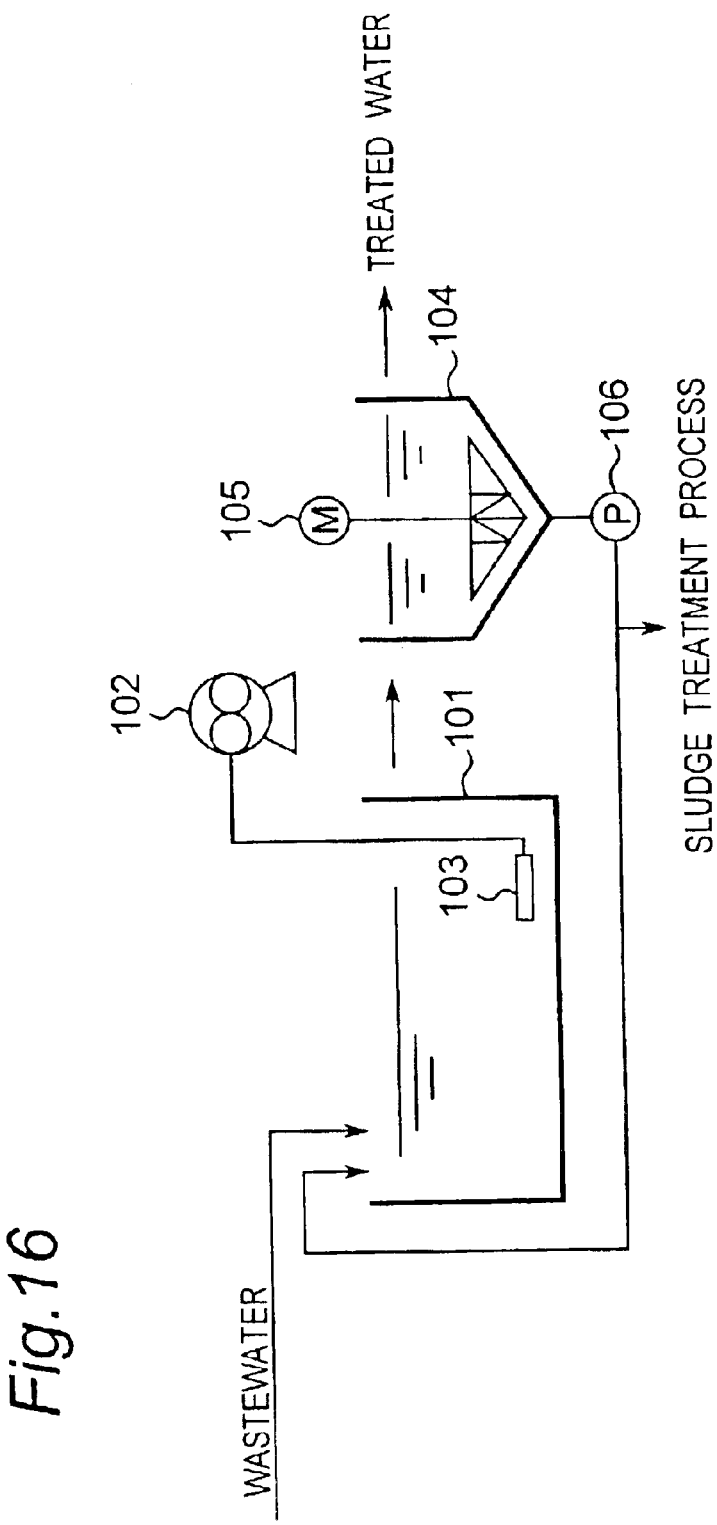
FIG. 16 is a block diagram showing a first example of a conventional wastewater treatment apparatus.
Figure 17:
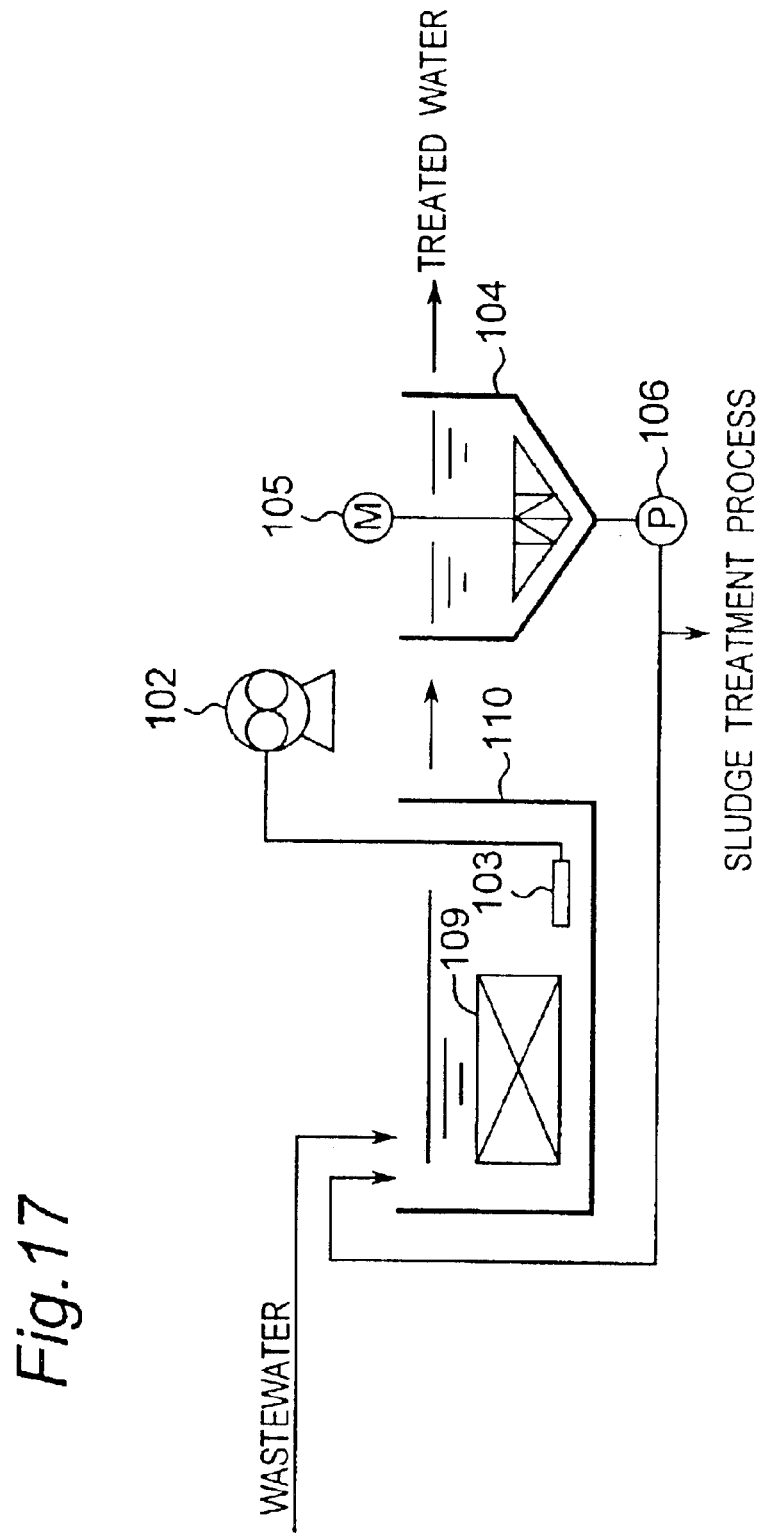
FIG. 17 is a block diagram showing a second example of a conventional wastewater treatment apparatus.
Figure 18:
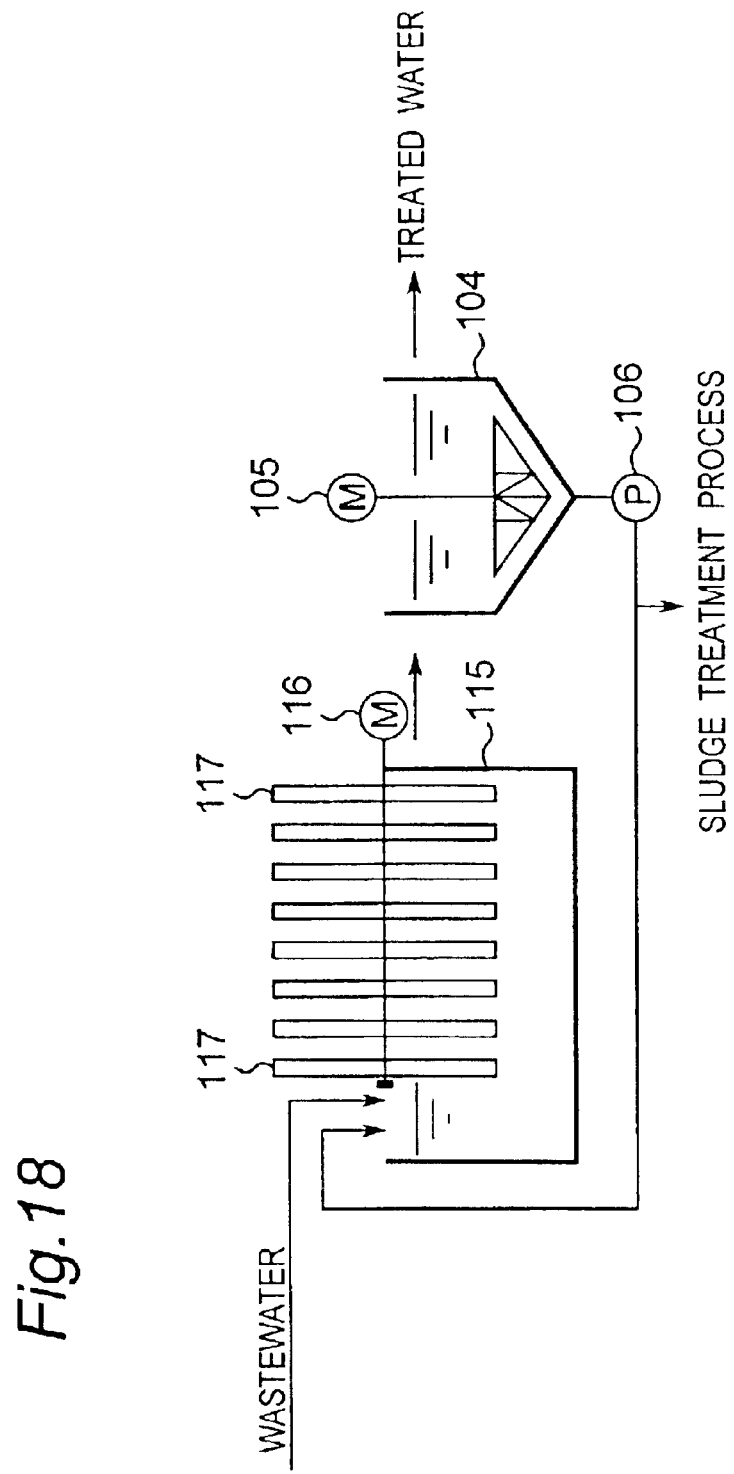
FIG. 18 is a block diagram showing a third example of a conventional wastewater treatment apparatus.

In the aeration tank 1 as a biological treatment tank, aeration air is discharged from a diffusing pipe 3 connected to a blower smaller in size than the blower 102 in the conventional wastewater treatment apparatus shown in FIG. 16. Furthermore, the sedimentation tank 4 has a gathering device 5. Furthermore, the returning pipe P1 is disposed so as to return the sedimented sludge from the sedimentation tank 4 to the foaming tank 7 by an operation of a returning pump 6.

The foaming tank 7 is disposed above the aeration tank 1 and equipped with a foaming machine 8, which drives rotation of an impeller (toothed gear) IP by a motor. In the conventional wastewater treatment apparatus shown in FIG. 16, oxygen is supplied to the aeration tank 101 only by the blower 102. On the other hand, oxygen is supplied to the aeration tank 1 by combination of the blower 2 smaller in size than the conventional blower and the foaming tank 7 in the first embodiment.

In the first embodiment, wastewater is introduced into the aeration tank 1. Air supplied from the blower 2 is discharged from the diffusing pipe 3 into this aeration tank 1, and aeration is performed by agitation with this discharged air in the aeration tank 1 so that oxygen in the air is supplied to the aeration tank 1.

Wastewater biologically treated in this aeration tank 1 is then introduced into the sedimentation tank 4 and separated into a solid and a liquid by sedimentation. The solid-liquid separated sludge is sent to the returning pipe P1 by the sludge returning pump 6, while part of the sludge is introduced into a sludge treatment process and dehydrated.

Meanwhile, the sludge is introduced from the returning pipe P1 into the foaming tank 7. In this foaming tank 7, since the foaming machine 8 rotates the impeller IP at an end portion thereof at a high speed, mechanical agitation is performed, air is finely sheared, and micro air is generated in wastewater in the tank. This foaming machine 8 can generate micro air having favorable dissolution efficiency with electrical energy lower than required by a diffusing pipe.

Furthermore, when the water depth of the foaming tank 7 and the water depth of the aeration tank 1 are compared, the foaming tank 7 is significantly shallow. Therefore, there are advantages that there is little influence of water pressure (pressure loss) upon discharge of air, and that electrical energy per unit air amount is low. For example, the water depth of the foaming tank 7 is about ⅕ of the water depth of the aeration tank 1.

Therefore, micro air can be generated with low electrical energy in the foaming tank 7, and, since the micro air has fine air bubbles, oxygen dissolution efficiency can be increased. In this embodiment, by circulating wastewater containing sludge between the aeration tank 1 and the foaming tank 7, an energy-saving wastewater treatment system can be constructed. As a specific example of the foaming machine 8, a product of Asahi-Yukizai Co., Ltd. can be adopted.

Second Embodiment

Figure 2:
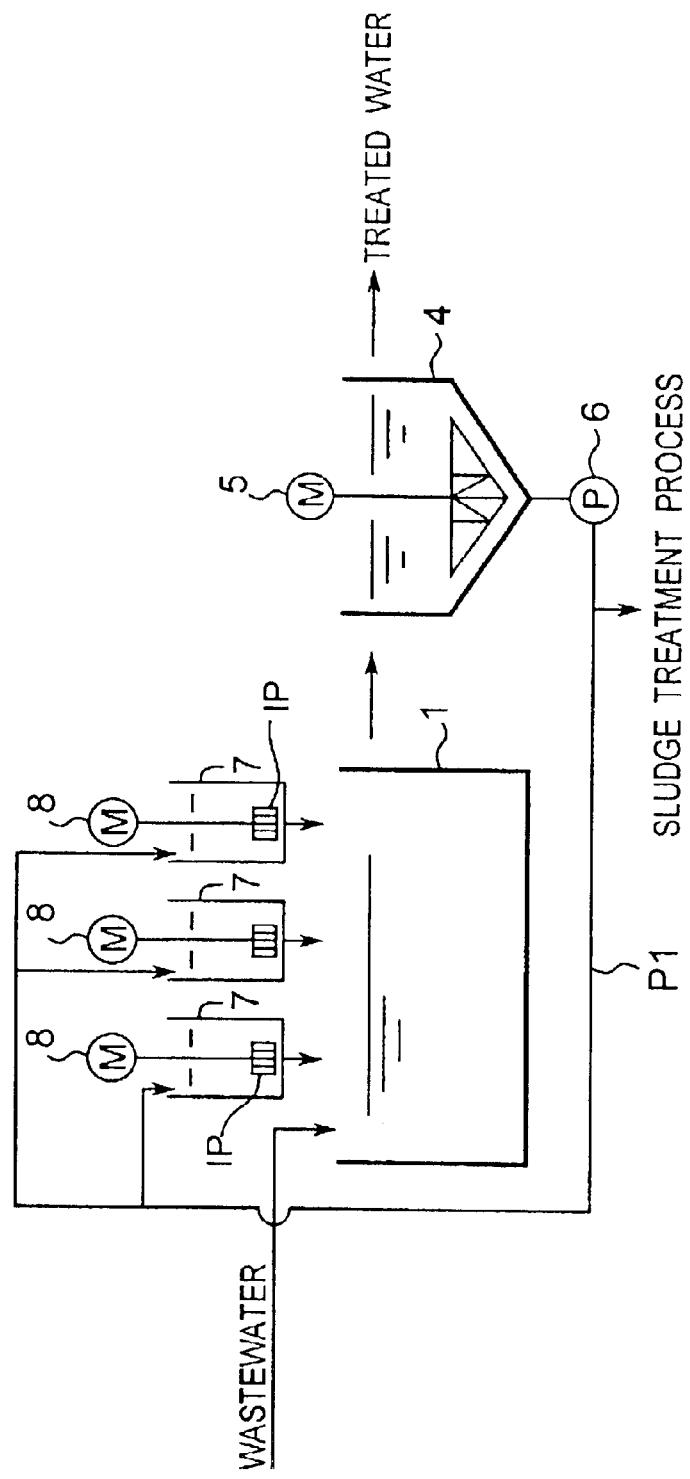
FIG. 2 is a block diagram showing a wastewater treatment apparatus according to a second embodiment of the invention.

FIG. 2 shows a configuration of a wastewater treatment apparatus according to a second embodiment of the invention. The second embodiment is the same as the aforementioned first embodiment except that three foaming tanks 7 are disposed above an aeration tank 1 and that no blower 2 or diffusing pipe 3 is included. Therefore, in the second embodiment, the same component members as in the aforementioned first embodiment are designated by the same reference numerals and detail explanation thereof is omitted.

In the second embodiment, dissolved oxygen in the aeration tank 1 is maintained by the three foaming tanks 7 without using any blower 2.

Since the water depth of this foaming tank 7 is specifically about 1 m, pressure loss in the foaming tank 7 is about ¼–⅕ in comparison with an aeration tank 1 having a water depth of 4–5 m. Therefore, in the second embodiment, lower electrical energy is required in comparison with a conventional apparatus. That is, an energy-saving wastewater treatment apparatus can be provided.

Furthermore, in the second embodiment, since air discharged from a foaming machine 8 is significantly finer than air discharged from a blower 2 via a diffusing pipe 3 such as those in the first embodiment, efficiency in dissolution of oxygen into water is high. Therefore, a dissolved oxygen concentration can be increased with a small amount of air.

Furthermore, the reason why the air discharged from the foaming machine 8 becomes fine is that air is finely sheared by rotation of the impeller IP at an end of the foaming machine 8 at a high speed and jetted into water.

Third embodiment

Figure 3:
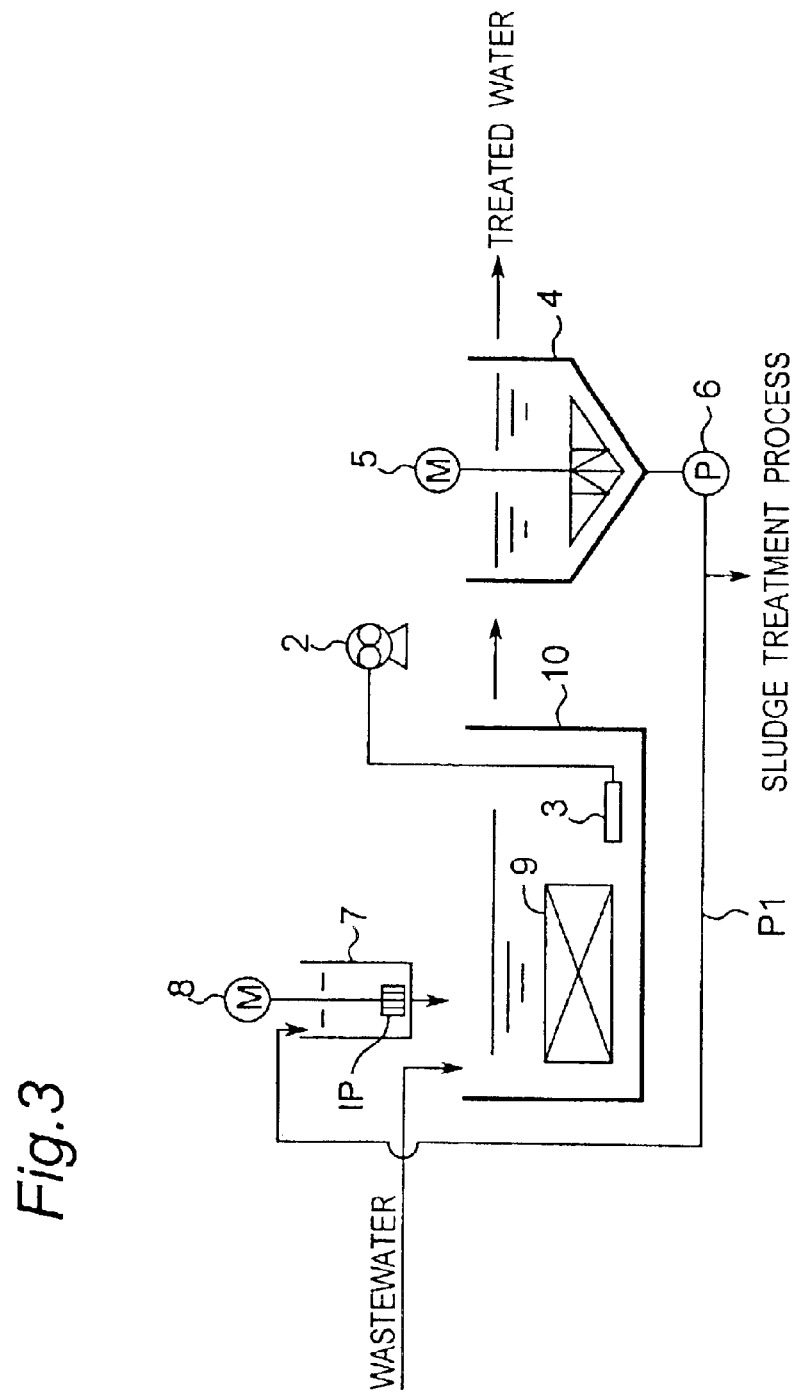
FIG. 3 is a block diagram showing a wastewater treatment apparatus according to a third embodiment of the invention.

FIG. 3 shows a configuration of a wastewater treatment apparatus according to a third embodiment of the invention. The third embodiment is the same as the first embodiment except that a filler 9 is installed in an aeration tank 1 to form a catalytic oxidation tank 10. Therefore, in the third embodiment, the same component members as in the aforementioned first embodiment are designated by the same reference numerals and detail explanation thereof is omitted.

In the third embodiment, since the filler 9 is installed in the catalytic oxidation tank 10, microorganisms are propagated and immobilized on the filler 9. Consequently, water quality of treated water obtained from a sedimentation tank 4 can be stabilized.

When the filler 9 is a radial ring form (aggregate of fibrous rings), a large amount of microorganisms can be propagated and immobilized thereon, resulting in stabilization of treated water quality. Furthermore, as the filler 9, one having a radial ring-shaped thread body, in which a ring-like thread body extends radially, can be adopted. As examples of a material thereof, various materials such as polyvinylidene chloride, polypropylene, vinylon as well as vinyl chloride and plastic can be considered, but the material is not particularly limited and can be selected depending on the type of wastewater.

Fourth Embodiment

Figure 4:
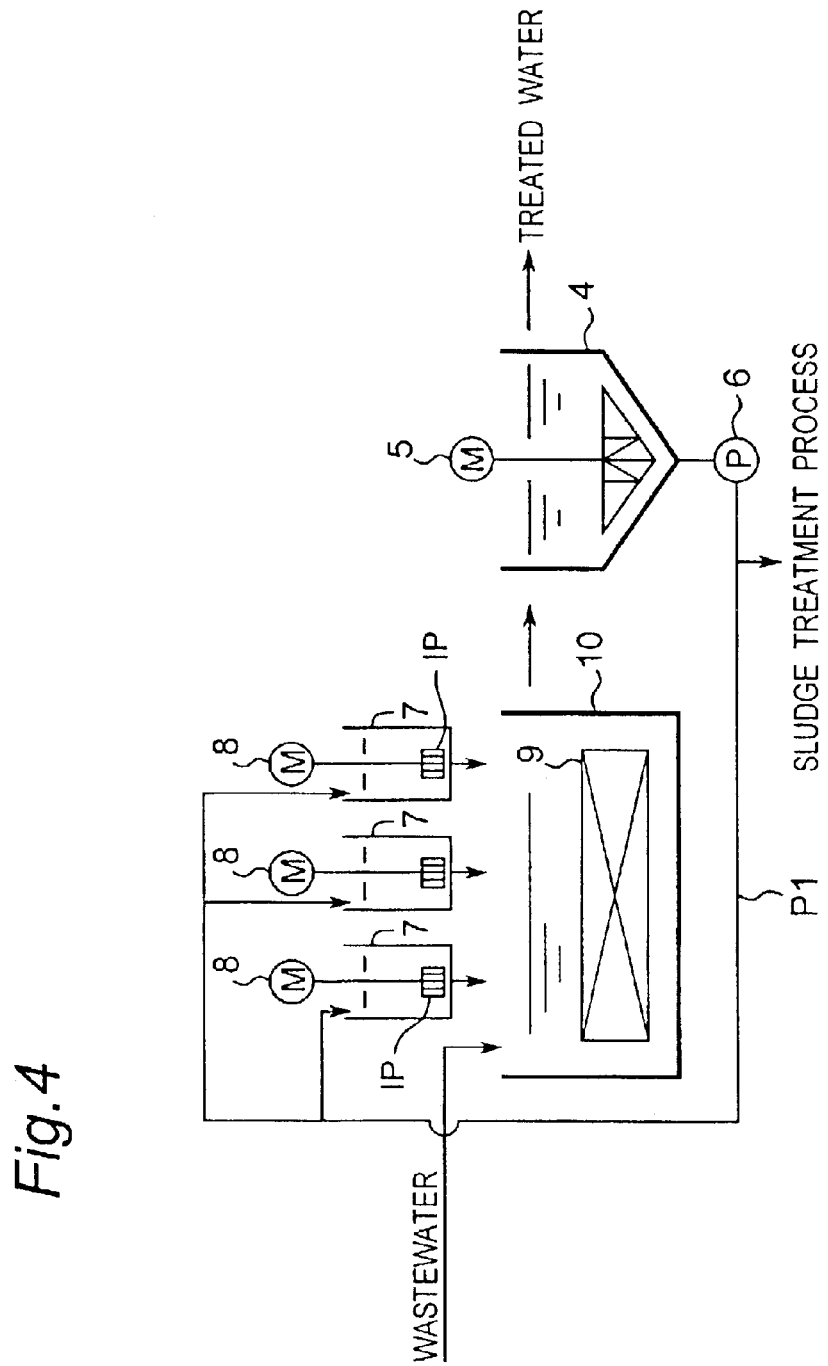
FIG. 4 is a block diagram showing a wastewater treatment apparatus according to a fourth embodiment of the invention.

FIG. 4 shows a configuration of a wastewater treatment apparatus according to a fourth embodiment of the invention. The fourth embodiment is the same as the second embodiment except that a filler 9 is installed in an aeration tank 1 to form a catalytic oxidation tank 10. Therefore, in the fourth embodiment, the same component members as in the aforementioned second embodiment are designated by the same reference numerals and detail explanation thereof is omitted.

In the fourth embodiment, since the filler 9 is installed in the catalytic oxidation tank 10, microorganisms are propagated and immobilized on the filler 9. Consequently, water quality of treated water obtained from a sedimentation tank 4 can be stabilized. As examples of a material of this filler 9, various materials such as polyvinylidene chloride, polypropylene, vinylon as well as vinyl chloride and plastic can be considered, but the material is not particularly limited and can be selected depending on the type of wastewater.

Fifth Embodiment

Figure 5:
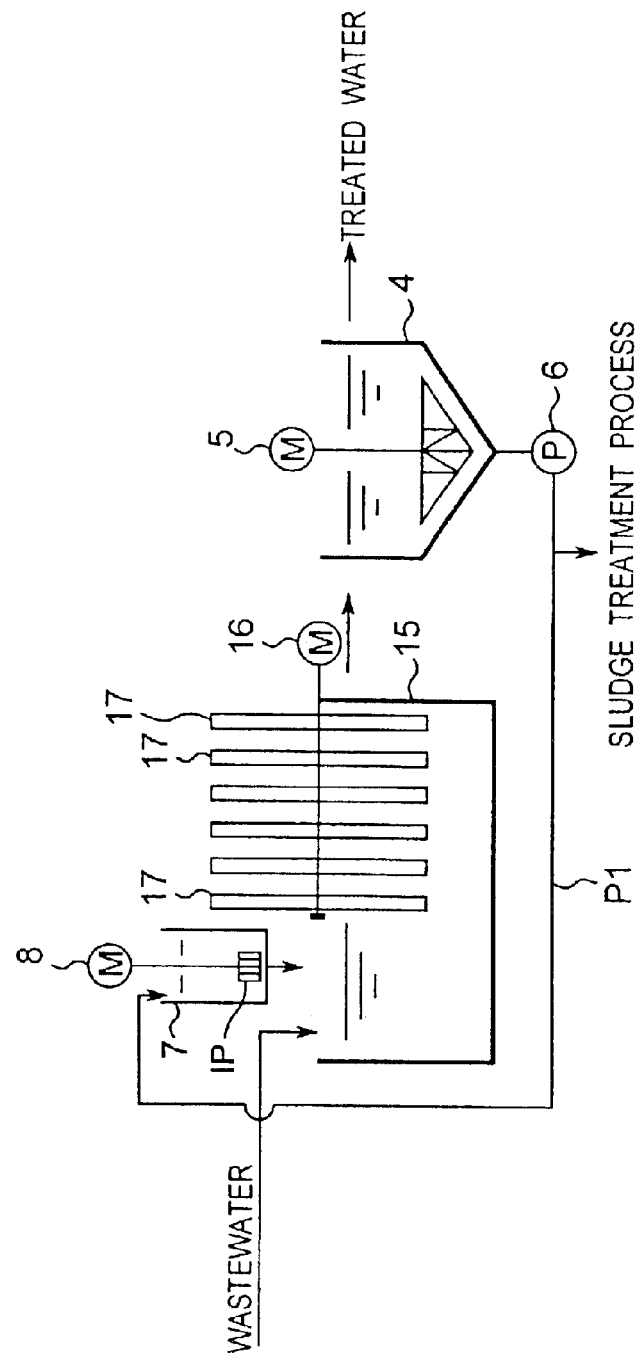
FIG. 5 is a block diagram showing a wastewater treatment apparatus according to a fifth embodiment of the invention.

FIG. 5 shows a configuration of a wastewater treatment apparatus according to a fifth embodiment of the invention. The fifth embodiment is the same as the aforementioned first embodiment except that a rotating disc 17 is installed in an aeration tank 1 to form a rotating disc tank 15 and that a blower 2, pipe from the blower 2 and diffusing pipe 3 are omitted. Therefore, in the fifth embodiment, the same component members as in the aforementioned first embodiment are designated by the same reference numerals and detail explanation thereof is omitted.

In the fifth embodiment, rotation of the rotating disc 17 is driven by a rotation drive unit 16, and a rotation center shaft J of the rotated rotating disc 17 is set in the vicinity of the uppermost level of a water surface of the rotating disc tank 15. This rotating disc 17 rotates about the rotation center shaft J as a central axis.

In the fifth embodiment, since the rotating disc 17 is installed in the rotating disc tank 15, microorganisms are propagated and immobilized on the rotating disc 17. Since this rotating disc 17, on which microorganisms are propagated and immobilized, is disposed in the rotating disc tank 15, water quality of treated water introduced from this rotating disc tank 15 into the sedimentation tank 4 can be stabilized, and water quality of treated water obtained from the sedimentation tank 4 can be stabilized.

As examples of a material of this rotating disc 17, various materials such as vinyl chloride, plastic and wood can be considered, but the material is not particularly limited and can be selected depending on the type of wastewater.

Sixth embodiment

Figure 6:
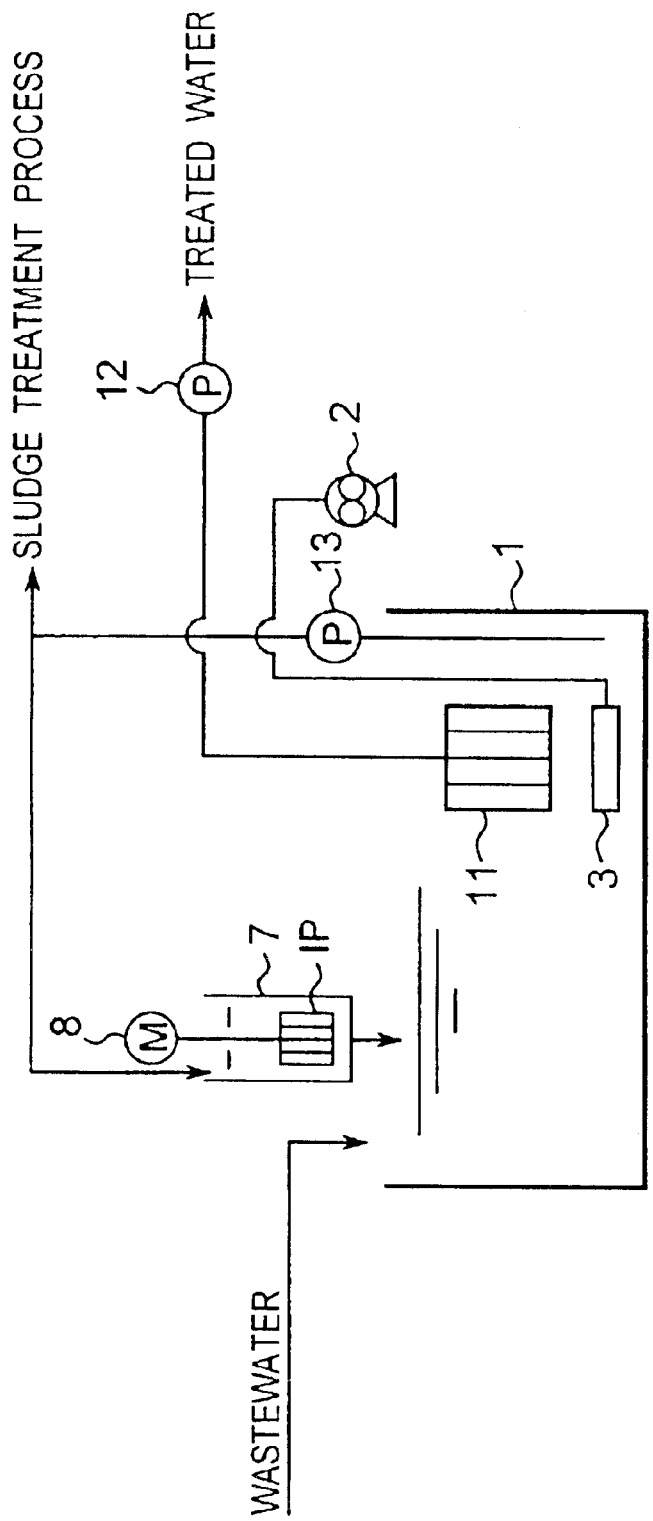
FIG. 6 is a block diagram showing a wastewater treatment apparatus according to a sixth embodiment of the invention.

FIG. 6 shows a configuration of a wastewater treatment apparatus according to a sixth embodiment of the invention. The sixth embodiment is the same as the aforementioned first embodiment except the following:

(1) a submerged membrane 11 is installed in an aeration tank 1;

(2) when air from a blower 2 is discharged from a diffusing pipe 3, a surface of a submerged membrane 11 above the diffusing pipe 3 is washed with air;

(3) treated water is filtered with the submerged membrane 11, which is an ultrafiltration membrane, and sucked by a treated water pump 12 so that the treated water can be secured; and (4) a sedimentation tank 4 is omitted.

Therefore, in the sixth embodiment, the same component members as in the aforementioned first embodiment are designated by the same reference numerals and detail explanation thereof is omitted.

In the sixth embodiment, the submerged membrane 11, which is an ultrafiltration membrane, is installed in the aeration tank 1 for filtration. That is, wastewater is sucked and filtered with the submerged membrane 11 and the treated water pump 12 to secure the treated water. As this submerged membrane 11, products of manufacturers such as Kubota corporation, Mitsubishi Rayon Co., Ltd. and Yuasa Corporation can be adopted.

In the sixth embodiment, since the submerged membrane 11, which is an ultrafiltration membrane, is installed in the aeration tank 1, a microorganism concentration in the aeration tank 1 is 10000 ppm or higher.

On the other hand, a microorganism concentration (MLSS concentration) in a usual aeration tank 1 not equipped with a submerged membrane 11 is about 3000 ppm, and hence toxic chemical substances harmful to microorganisms cannot be treated.

However, when the microorganism concentration (MLSS concentration) is 10000 ppm or higher as in the case of the sixth embodiment, the amount of microorganisms per unit volume is significantly increased. Therefore, a proportion of toxic chemical substances relative to microorganisms is decreased and hence wastewater can be treated with microorganisms.

Figure 15:
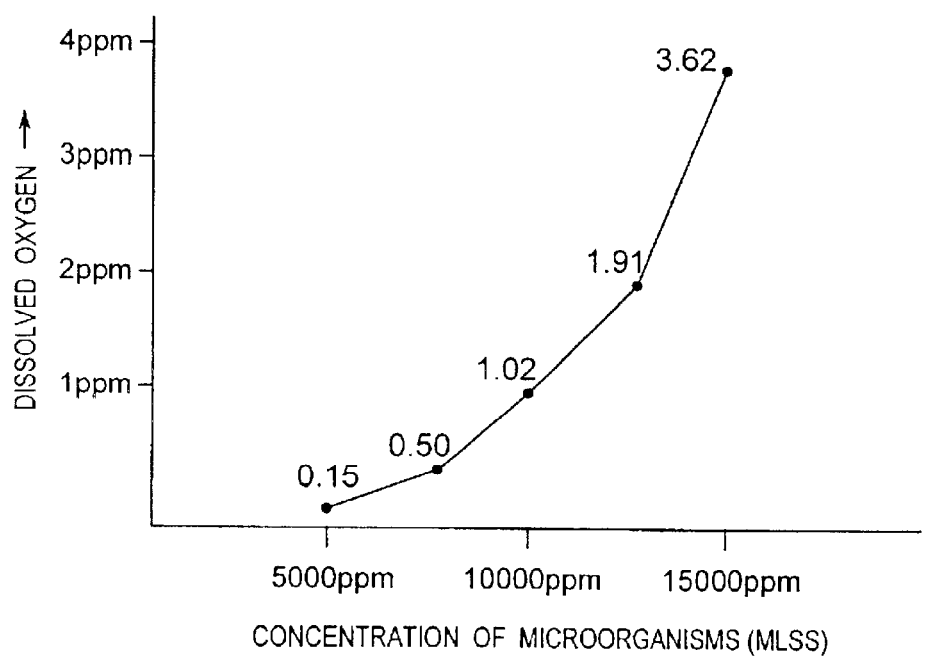
FIG. 15 is a graph showing a relationship between microorganism concentrations and dissolved oxygen.

In particular, when a microorganism concentration in introduced wastewater is 10000 ppm or higher, air bubbles are made fine in a water tank 7, in which air bubbles are generated by a foaming machine 8, which is a machine for generating air bubbles, efficiency in dissolution of oxygen in the air into water is improved, and (1) a concentration of oxygen dissolved in wastewater can be increased with low power. Furthermore, (2) fine air bubbles adhere to sludge in wastewater so that surfaces of sludge masses remain aerobic. Furthermore, (3) since micro air adheres to sludge and moves in the water tank, air bubbles are not immediately scattered in the air, and hence oxygen dissolved in the water tank can be maintained with a small amount of air. One example thereof is shown in FIG. 15. FIG. 15 shows concentrations of oxygen dissolved in wastewater 2 minutes after the wastewater is introduced into the foaming tank 7. When the microorganism concentration exceeds 10000 ppm, the concentration of dissolved oxygen dramatically increases.

In the sixth embodiment, the concentration of dissolved oxygen in the aeration tank 1 is maintained and determined by micro air generated by the foaming machine 8 and air discharged from the diffusing pipe 3 to wash the surface of the submerged membrane 11 with air in the foaming tank 7.

Furthermore, in the sixth embodiment, since a system in which the concentration of dissolved oxygen is maintained by micro air generated by the foaming machine 8 in the foaming tank 7 is incorporated in the wastewater treatment apparatus, an energy-saving system can be provided. Since the submerged membrane 11 is installed at the same time, the microorganism concentration in the aeration tank 1 is made 10000 ppm or higher, and hence toxic chemical substances can be decomposed. It is noted that reference numeral 13 denotes a sludge returning pump for transferring sludge accumulated in an aeration layer with pressure.

Seventh Embodiment

Figure 7:
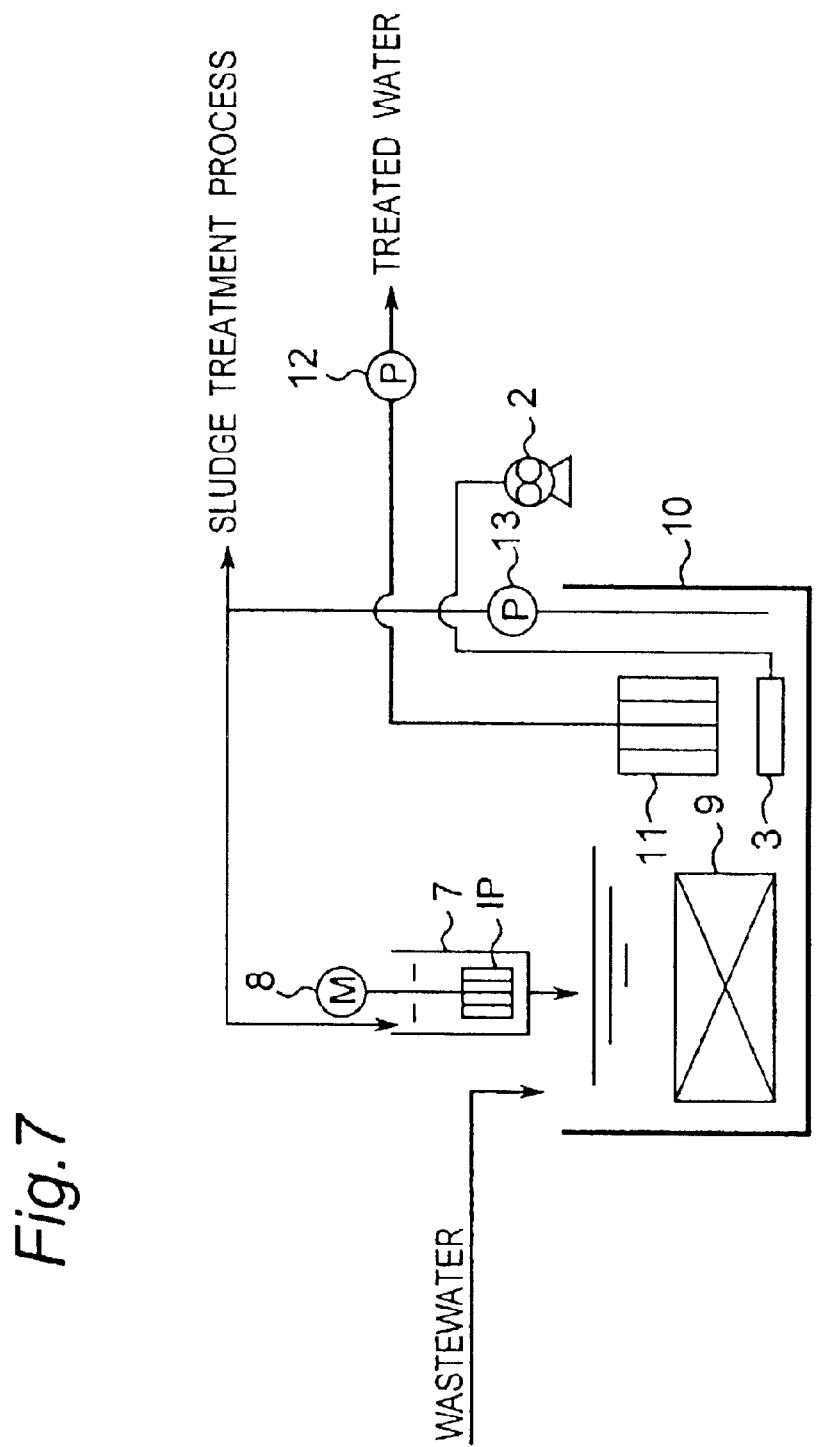
FIG. 7 is a block diagram showing a wastewater treatment apparatus according to a seventh embodiment of the invention.

FIG. 7 shows a configuration of a wastewater treatment apparatus according to a seventh embodiment of the invention. The seventh embodiment is the same as the sixth embodiment except that a filler 9 is installed in an aeration tank 1 to form a catalytic oxidation tank 10. Therefore, in the seventh embodiment, the same component members as in the aforementioned sixth embodiment are designated by the same reference numerals and detail explanation thereof is omitted.

In the seventh embodiment, since the filler 9 is installed in the catalytic oxidation tank 10, microorganisms are propagated and immobilized on the filler 9. Consequently, water quality of treated water obtained from a treated water pump 12 can be stabilized. As examples of a material of this filler 9, various materials such as polyvinylidene chloride, polypropylene, vinylon as well as vinyl chloride and plastic can be considered, but the material is not particularly limited and can be selected depending on the type of wastewater.

Eighth Embodiment

Figure 8:
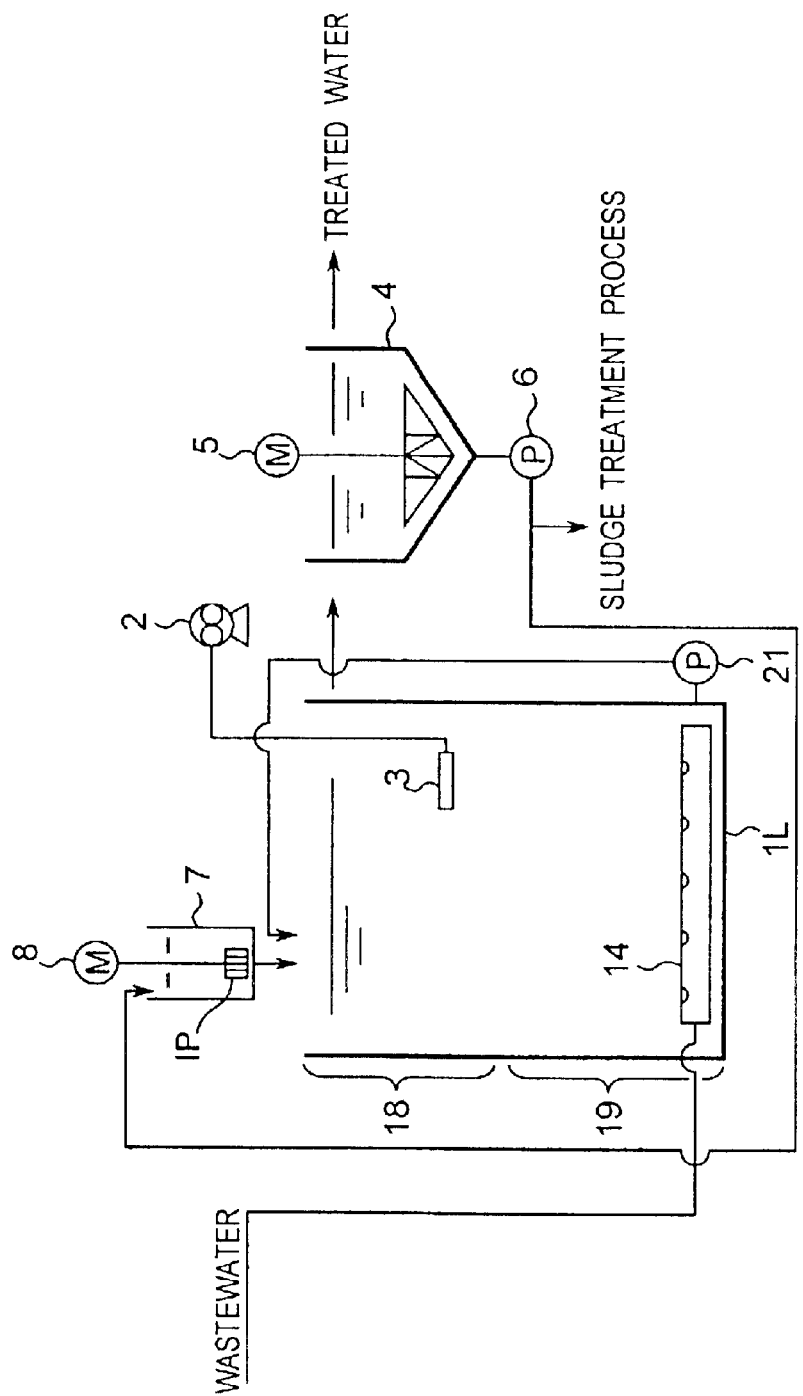
FIG. 8 is a block diagram showing a wastewater treatment apparatus according to an eighth embodiment of the invention.

FIG. 8 shows a configuration of a wastewater treatment apparatus according to an eighth embodiment of the invention. An aeration tank 1L is more than twice as deep as the water depth of the aeration tank 1 of the first embodiment and constituted by an upper portion 18 and a lower portion 19. Furthermore, the eighth embodiment is the same as the first embodiment except that wastewater is introduced from an introducing pipe 14 installed at the bottom of the lower portion 19 into the aeration tank 1L. Therefore, in the eighth embodiment, the same component members as in the aforementioned first embodiment are designated by the same reference numerals and detail explanation thereof is omitted.

In the eighth embodiment, since the diffusing pipe 3 is disposed closer to a sidewall in the upper portion 18 and air is discharged from this diffusing pipe 3, the concentration of dissolved oxygen in the aeration tank 1L is increased, and thus an aerobic condition is maintained.

Meanwhile, the introducing pipe 14 is disposed in the lowest portion of the lower portion 19, and wastewater flows from this introducing pipe 14 into the lower portion 19. Since this lower portion 19 is not subjected to aeration, it is anaerobic. Furthermore, a circulating pump 21 is disposed outside the sidewall of this lower portion 19, and this circulating pump 21 has a function of circulating wastewater from the lower portion 19 to the upper portion 18. Consequently, wastewater of the lower portion 19 and wastewater of the upper portion 18 are mixed.

According to the eighth embodiment having the above constitution, when nitrogen is included in wastewater, denitrification can be achieved since wastewater is circulated between the lower portion 19, in which an anaerobic process is performed, and the upper portion 18, in which an aerobic process is performed, by the circulating pump 21.

According to this constitution of the eighth embodiment, wastewater containing micro air is introduced from an exit of a foaming tank 7 having a foaming machine 8 into the upper portion 18 of the aeration tank 1L so that the concentration of dissolved oxygen in this upper portion 18 is maintained. Consequently, there can be provided an energy-saving system, and, in addition, denitrification can be achieved by circulating wastewater between the anaerobic process and the aerobic process.

Ninth Embodiment

Figure 9:
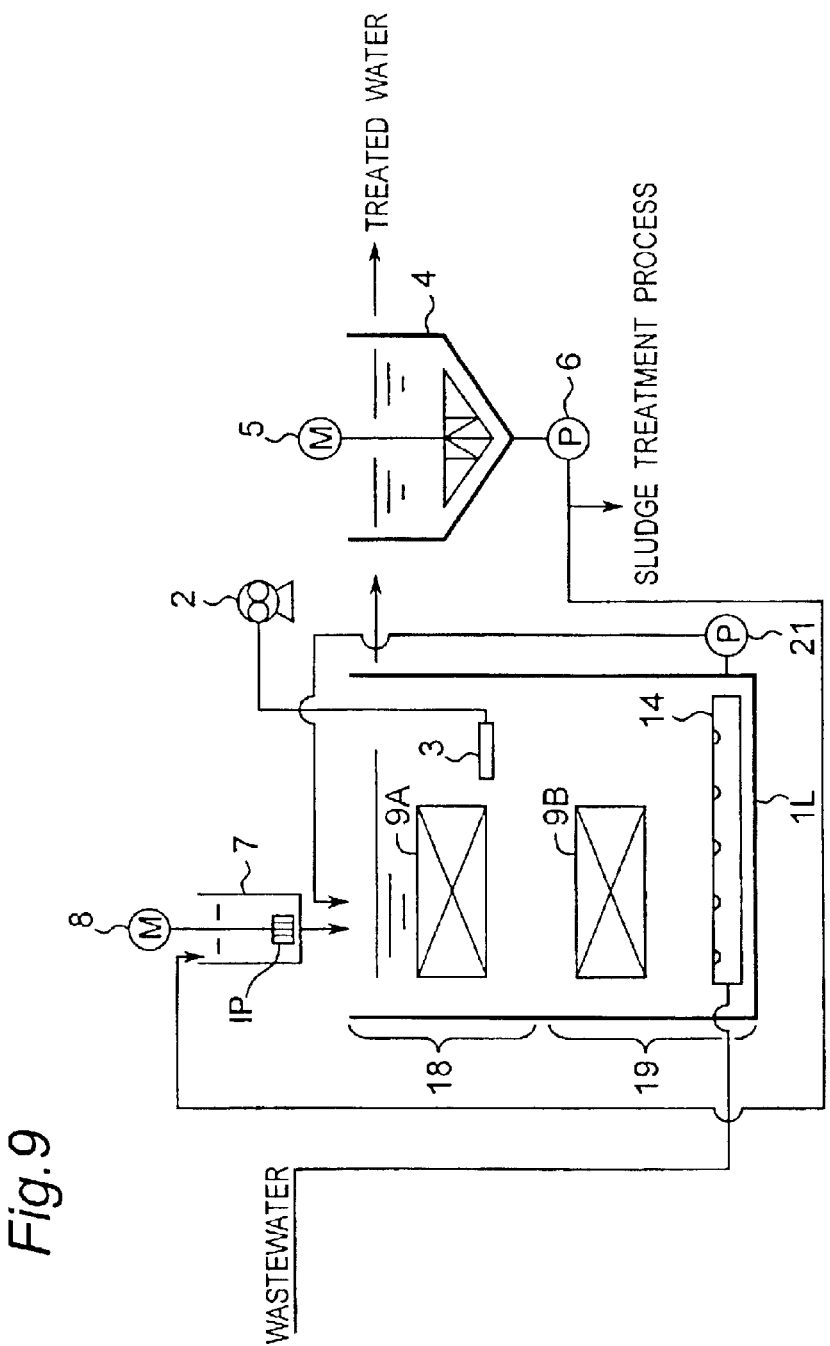
FIG. 9 is a block diagram showing a wastewater treatment apparatus according to a ninth embodiment of the invention.

FIG. 9 shows a configuration of a wastewater treatment apparatus according to a ninth embodiment of the invention. The ninth embodiment is the same as the eighth embodiment except that contact materials 9A, 9B are filled in an upper portion 18 and a lower portion 19, respectively, of an aeration tank 1L. Therefore, in the ninth embodiment, the same component members as in the aforementioned eighth embodiment are designated by the same reference numerals and detail explanation thereof is omitted.

In the ninth embodiment, the filler 9A is installed in the upper portion 18, and microorganisms are propagated and immobilized thereon. Furthermore, the filler 9B is also installed in the lower portion 19, and microorganisms are propagated and immobilized thereon. In the ninth embodiment, since the fillers 9A, 9B are installed in the upper portion 18 and the lower portion 19, respectively, of the aeration tank 1L, treatment is stabilized in comparison with the eighth embodiment. Furthermore, according to the ninth embodiment, energy saving, denitrification and stabilization of treatment can be achieved.

Tenth Embodiment

Figure 10:
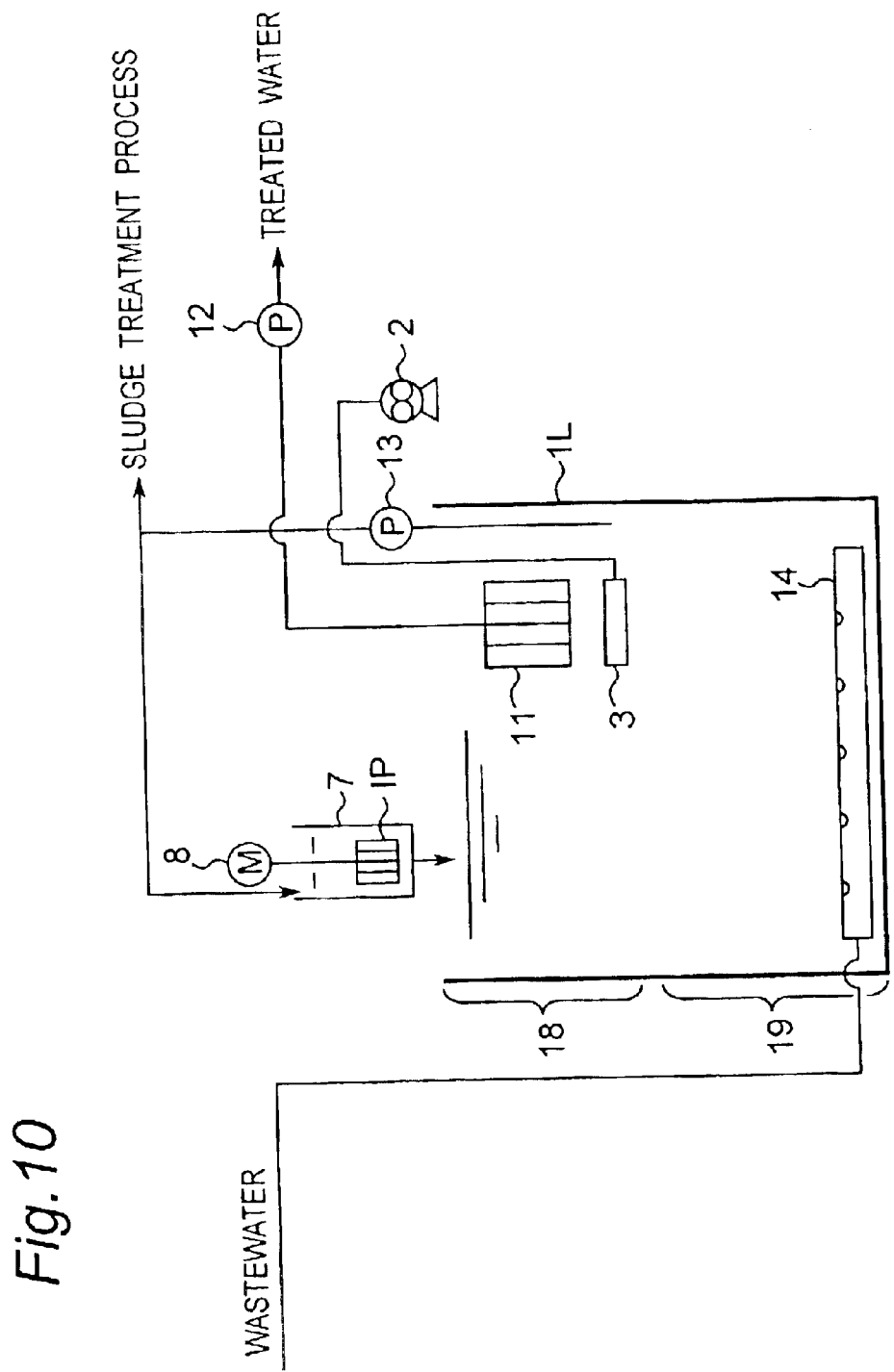
FIG. 10 is a block diagram showing a wastewater treatment apparatus according to a tenth embodiment of the invention.

FIG. 10 shows a configuration of a wastewater treatment apparatus according to a tenth embodiment of the invention. The tenth embodiment is the same as the eighth embodiment except that a submerged membrane 11 is disposed above a diffusing pipe 3 in an upper portion 18 of an aeration tank 1L to perform solid-liquid separation and that a sedimentation tank 4 is omitted. Therefore, in the tenth embodiment, the same component members as in the aforementioned eighth embodiment are designated by the same reference numerals and detail explanation thereof is omitted.

In the tenth embodiment, the submerged membrane 11 is disposed above the diffusing pipe 3 in the upper portion 18. Consequently, solid-liquid separation of microorganisms and treated water can be physically performed in a reliable manner by the submerged membrane 11, which is an ultra-filtration membrane. Manufacturer and the like of this submerged membrane 11 are the same as in the sixth embodiment.

Furthermore, a sludge returning pump 13 is disposed at an end of the water tank 1L. In this sludge returning pump 13, wastewater containing sludge in the upper portion 18 is introduced into a foaming tank 7, and oxygen in micro air is mixed into the wastewater in this foaming tank 7. Then, wastewater containing micro air from the foaming tank 7 is returned to the upper portion 18 of the aeration tank 1L. According to the tenth embodiment, energy saving, denitrification, and treatment of toxic chemical substances can be achieved.

Eleventh Embodiment

Figure 11:
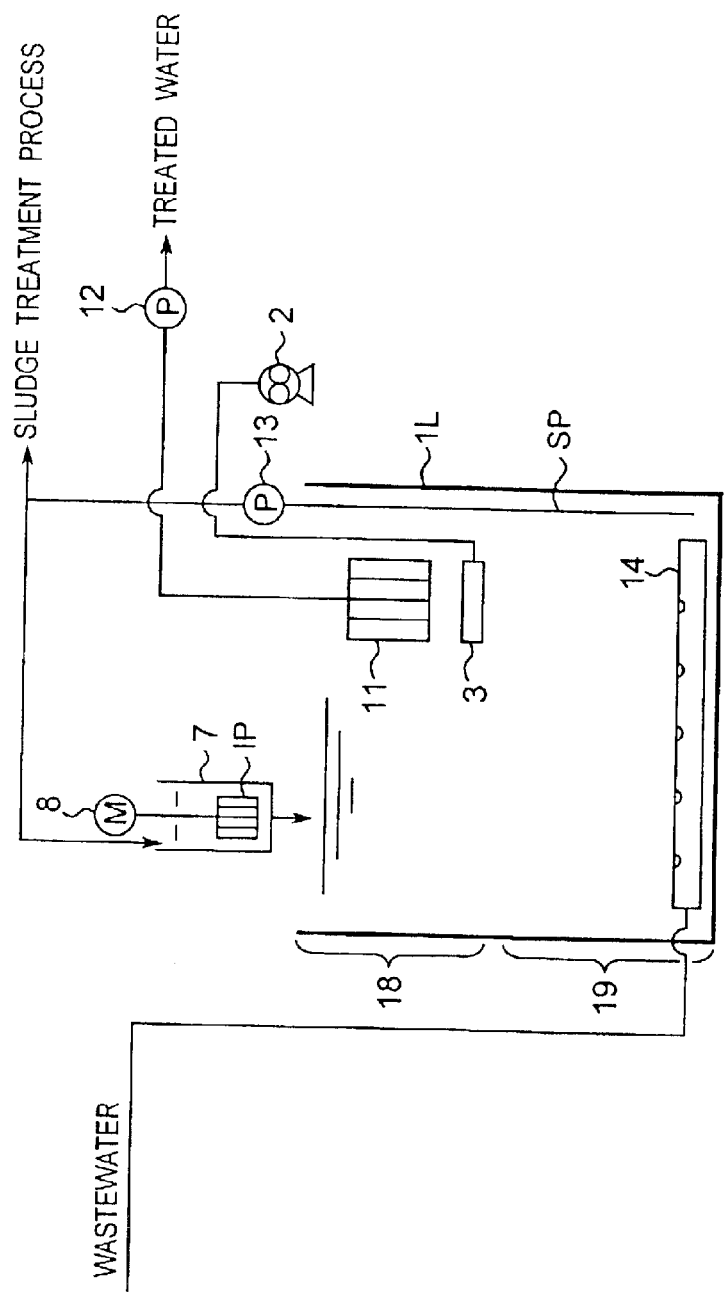
FIG. 11 is a block diagram showing a wastewater treatment apparatus according to an eleventh embodiment of the invention.

FIG. 11 shows a configuration of a wastewater treatment apparatus according to an eleventh embodiment of the invention. The eleventh embodiment is the same as the tenth embodiment except that a suction pipe SP of a sludge returning pump 13 is longer than in the tenth embodiment and extends to the vicinity of a lower portion 19, which is an anaerobic portion, through an upper portion 18. Therefore, in the eleventh embodiment, the same component members as in the aforementioned tenth embodiment are designated by the same reference numerals and detail explanation thereof is omitted.

In the eleventh embodiment, since the suction pipe SP of the sludge returning pump 13 is long and extends to the lower portion 19, which is an anaerobic portion, a concentrated sludge mass in the lower portion 19, which is an anaerobic portion, can be introduced into a foaming tank 7. This sludge mass also includes massive granulated sludge generated in an anaerobic process. This sludge mass is anaerobic inside and micro air easily adheres to its surface. Therefore, by attaching micro air to the sludge mass, aerobicity in the upper portion 18 can be maintained with a small amount of air. That is, energy saving can be achieved.

Furthermore, since the suction pipe SP of the sludge returning pump 13 is long and extends to the anaerobic portion of the lower portion 19, sludge in the lowest portion is moved to the uppermost foaming tank 7. Consequently, in the eleventh embodiment, agitation in the aeration tank 1L can be performed more reliably than in the tenth embodiment.

According to the eleventh embodiment, energy saving by installation of the foaming tank 7, and denitrification by the upper portion 18, lower portion 19 and sludge returning pump 13 and treatment of toxic chemical substances by the submerged membrane 11 can be achieved.

Twelfth Embodiment

Figure 12:
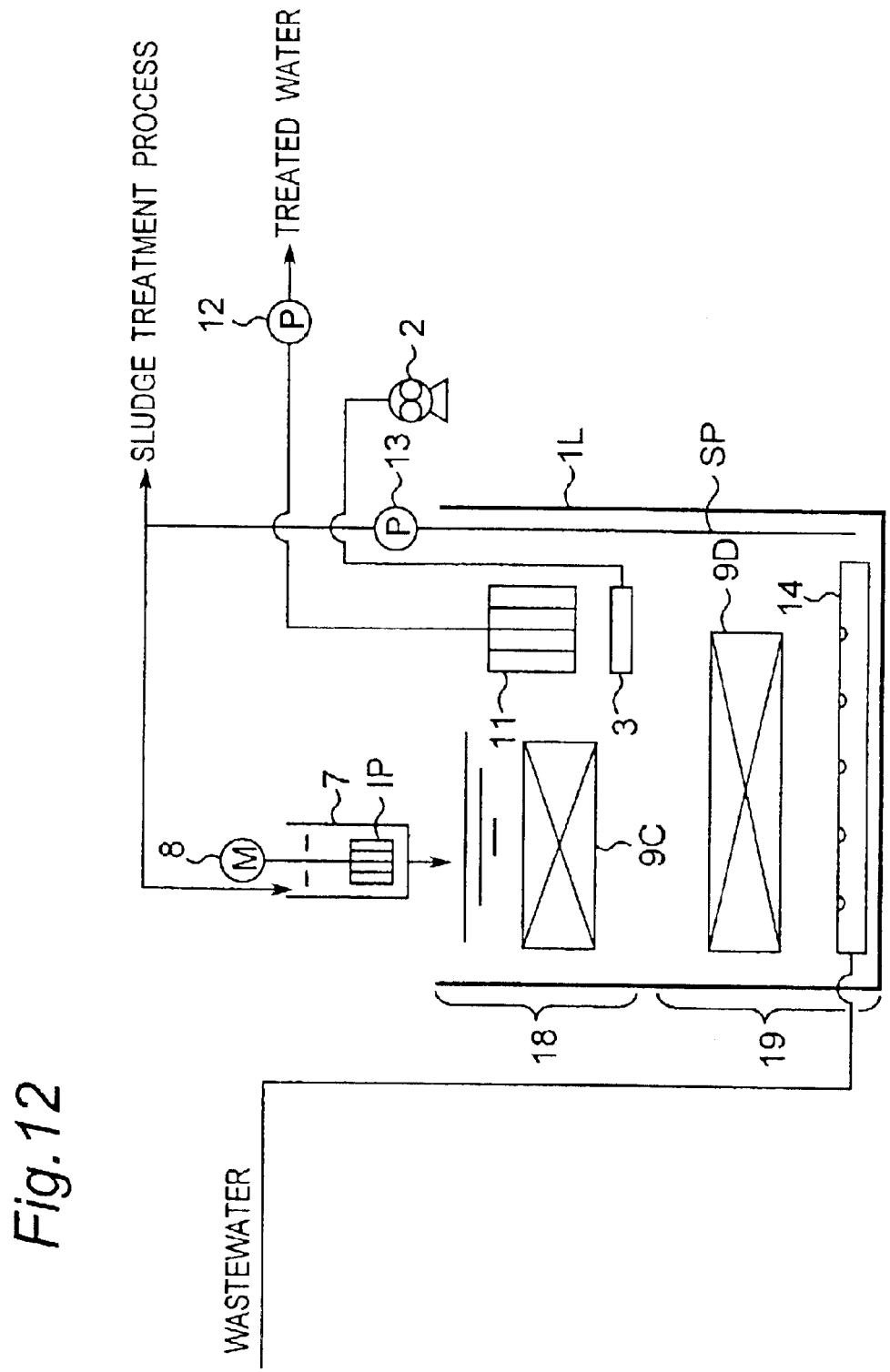
FIG. 12 is a block diagram showing a wastewater treatment apparatus according to a twelfth embodiment of the invention.

FIG. 12 shows a configuration of a wastewater treatment apparatus according to a twelfth embodiment of the invention. The twelfth embodiment is the same as the eleventh embodiment except that contact materials 9C, 9D are filled in an upper portion 18 and a lower portion 19, respectively, of an aeration tank 1L. Therefore, in the twelfth embodiment, the same component members as in the aforementioned eleventh embodiment are designated by the same reference numerals and detail explanation thereof is omitted.

In the twelfth embodiment, the filler 9C is installed in the upper portion 18, and microorganisms are propagated and immobilized thereon. Furthermore, the filler 9D is installed in the lower portion 19, and microorganisms are propagated and immobilized thereon. In this embodiment, since the fillers 9C, 9D are installed in the upper portion 18 and the lower portion 19, respectively, of the aeration tank 1L, wastewater treatment can be stabilized in comparison with the aforementioned eleventh embodiment. In the twelfth embodiment, energy saving by installation of a foaming tank 7, denitrification by provision of the upper portion 18, lower portion 19 and sludge returning pump 13, treatment of toxic chemical substances by a submerged membrane 11 and stabilization of treatment by the fillers 9C, 9D can be achieved.

Thirteenth Embodiment

Figure 13:
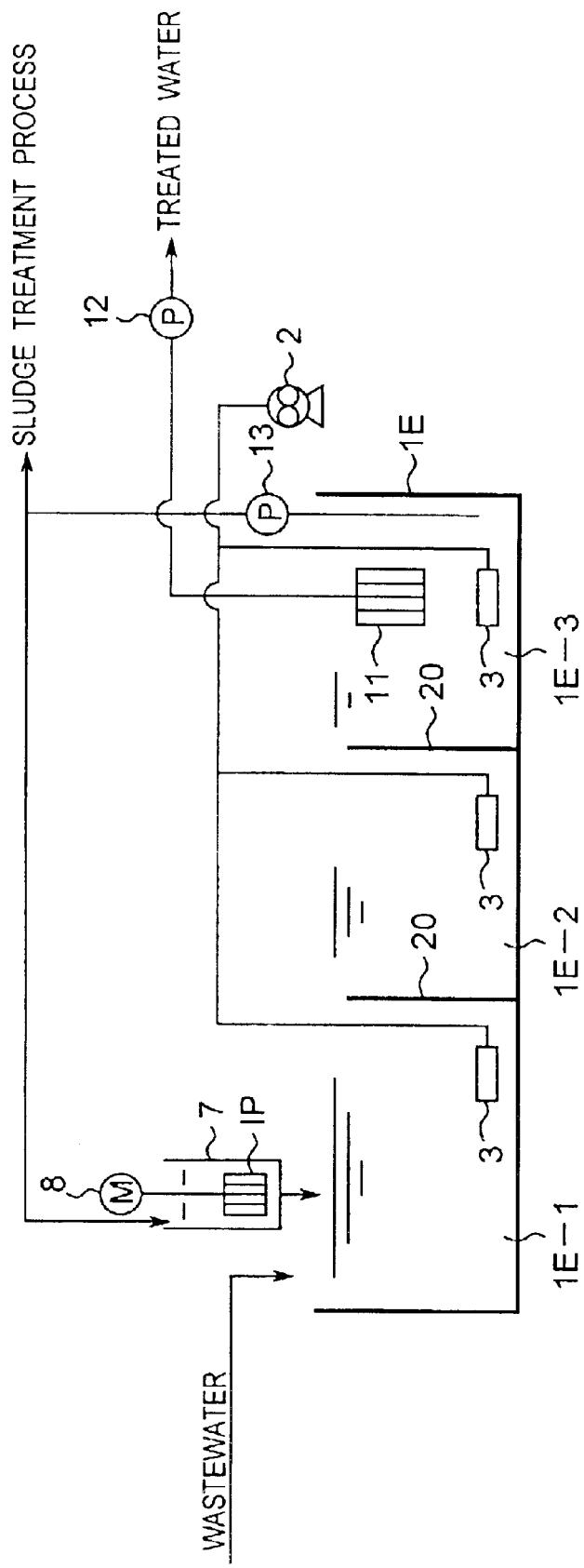
FIG. 13 is a block diagram showing a wastewater treatment apparatus according to a thirteenth embodiment of the invention.

FIG. 13 shows a configuration of a wastewater treatment apparatus according to a thirteenth embodiment of the invention. The thirteenth embodiment is the same as the sixth embodiment except that two partition walls 20 are installed in an aeration tank 1E. Therefore, in the thirteenth embodiment, the same component members as in the aforementioned sixth embodiment are designated by the same reference numerals and detail explanation thereof is omitted.

In the thirteenth embodiment, the aeration tank 1E with long sideways is adopted, and this aeration tank 1E with long sideways is partitioned by the partition walls 20, 20 into three tanks 1E-1, 1E-2, 1E-3. Wastewater is introduced successively into these three tanks 1E-1, 1E-2, 1E-3 and treated. In particular, since substances with poor microorganism decomposing property among toxic chemical substances require a long time for treatment thereof, the constitution of the thirteenth embodiment is required.

In the thirteenth embodiment, a foaming tank 7 is disposed above the first water tank 1E-1, and a sludge returning pump 13 is disposed in the final water tank 1E-3. This sludge returning pump 13 returns microorganism sludge concentrated by a submerged membrane 11 disposed above a diffusing pipe 3 of this final water tank 1E-3 to the first tank 1E-3 via the foaming tank 7. By this return, a microorganism concentration of the whole water tank 1E can be averaged.

Furthermore, in the thirteenth embodiment, aerobicity is maintained by air generated in the foaming tank 7 and air discharged by a blower 2 from the diffusing pipe 3 to the tanks 1E-1-1E-3. According to the thirteenth embodiment, energy saving by installation of the foaming tank 7 and treatment of toxic chemical substances by installation of the submerged membrane 11 can be achieved.

Fourteenth Embodiment

Figure 14:
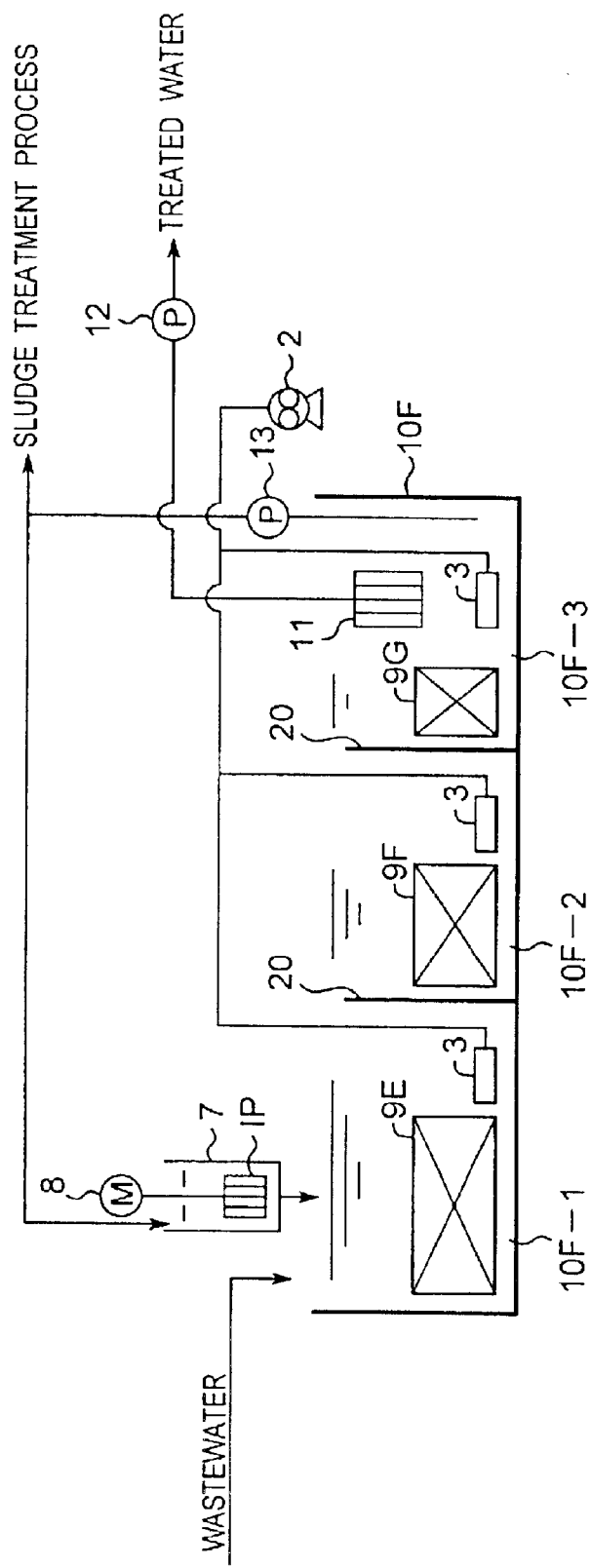
FIG. 14 is a block diagram showing a wastewater treatment apparatus according to a fourteenth embodiment of the invention.

FIG. 14 shows a configuration of a wastewater treatment apparatus according to a fourteenth embodiment of the invention. The fourteenth embodiment is the same as the thirteenth embodiment except that contact materials 9E, 9F, 9G are filled in three tanks 10F-1, 10F-2, 10F-3, respectively, of an aeration tank 10F. Therefore, in the fourteenth embodiment, the same component members as in the aforementioned thirteenth embodiment are designated by the same reference numerals and detail explanation thereof is omitted.

In the fourteenth embodiment, the fillers 9E, 9F, 9G are installed in the three catalytic oxidation tanks 10F-1, 10F-2, 10F-3, respectively, which are divided by partition walls 20. By this constitution, treatment is stabilized in comparison with the thirteenth embodiment. Therefore, according to the fourteenth embodiment, energy saving by installation of a foaming tank 7, treatment of toxic chemical substances by installation of a submerged membrane 11 and stabilization of treatment by installation of the fillers 9E–9G can be achieved.

First Experimental Example

As a specific experimental example, an experimental example of a wastewater treatment apparatus using an experimental apparatus having the same structure as in the first embodiment shown in FIG. 1 is described below.

In the first experimental example, the volumes of an aeration tank 1, sedimentation tank 4 and foaming tank 7 were 1 m3, 0.4 m3 and 0.05 m3, respectively, and motor powers of a foaming machine 8 and a blower 2 were 100 W (watt) and 400 W, respectively, to treat wastewater containing organic matter.

On the other hand, a blower 102 with 750 W was used in an experimental apparatus having a conventional constitution as shown in FIG. 16 to obtain the same treatment ability as in the first experimental example. Therefore, according to the first experimental example, wastewater could be treated with energy saving in comparison with the conventional constitution. That is, power consumed by the first experimental example is 400 W+100 W. Since power consumed in the conventional constitution is 750 W, 33% energy saving in comparison with the conventional constitution could be achieved (500/750=0.67). It is noted that quality of influent wastewater included pH 7.3 and BOD (Biochemical Oxygen Demand) of 82 ppm. On the other hand, treated water quality included pH 7.1 and BOD of 12 ppm, which showed sufficient treatment.

Second Experimental Example

As a specific experimental example, an experimental example of a wastewater treatment apparatus using an experimental apparatus having the same structure as in the seventh embodiment shown in FIG. 7 is described below.

In the second experimental example, the volumes of an aeration tank 10 and a foaming tank 7 were 1 m3 and 0.05 m3, respectively, and motor powers of a foaming machine 8 and a blower 2 were 100 W (watt) and 400 W, respectively, to treat wastewater containing organic matter such as dimethylformamide.

On the other hand, a blower 102 with 750 W was used in an experimental apparatus of an aeration tank 101 having a conventional constitution as shown in FIG. 16. Therefore, in the second experimental example, wastewater could be treated with energy saving as obtained from the following expression (1).

$$(400\ W + 100\ W)/750\ W = 0.67 \quad (1)$$

That is, according to the second experimental example, 33% energy saving could be achieved. Quality of influent wastewater upon wastewater treatment by the second experimental example included pH 7.5, BOD of 96 ppm and a dimethylformamide concentration of 180 ppm. Quality of treated water included pH 7.2, BOD of 12 ppm and a dimethylformamide concentration of 1 ppm or lower, which showed sufficient treatment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wastewater treatment method comprising steps of treating wastewater by introducing the wastewater into a biological treatment tank, introducing the treated water from the biological treatment tank into a sedimentation tank, separating sludge generated in this sedimentation tank by sedimentation, treating this sedimented sludge by introducing the sludge into a foaming tank having a function of generating air bubbles, and returning the sludge treated in the foaming tank to the biological treatment tank.

2. The wastewater treatment method according to claim 1, wherein the biological treatment tank is any one of an aeration tank, catalytic oxidation tank or rotating disc tank or a combination thereof.

3. The wastewater treatment method according to claim 1, wherein the wastewater is wastewater containing organic matter.

4. A wastewater treatment apparatus comprising a biological treatment tank, in which wastewater is treated by organisms to form a treated water product, a sedimentation tank, into which the treated water product from the biological treatment tank is introduced and in which a first sludge is generated and separated by sedimentation, and a foaming tank, into which the first sludge sedimented in the sedimentation tank is introduced and which has a function of generating air bubbles and treats the first sludge to produce a second sludge, and returns the second sludge to the biological treatment tank.

5. The wastewater treatment apparatus according to claim 4, wherein the biological treatment tank is any one of an aeration tank, catalytic oxidation tank or rotating disc tank or a combination thereof.

6. The wastewater treatment apparatus according to claim 4, wherein the foaming tank is disposed above the biological treatment tank and has a foaming machine that rotates at a high speed so that an impeller generates bubbles.

7. The wastewater treatment apparatus according to claim 4, wherein the biological treatment tank is an aeration tank or catalytic oxidation tank or a combination thereof, an upper portion of the aeration tank or catalytic oxidation tank is constituted by an aerobic portion, and a lower portion thereof is constituted by an anaerobic portion, and wastewater is introduced from the lower portion into the biological treatment tank and wastewater is circulated in the biological treatment tank.

8. The wastewater treatment apparatus according to claim 7, wherein a submerged membrane is installed in the upper portion of the aeration tank or catalytic oxidation tank, a sludge transporting device is provided to introduce sludge in the anaerobic portion of the lower portion of the aeration tank or catalytic oxidation tank to the foaming tank, and sludge is introduced from the foaming tank into the aerobic portion of the upper portion of the aeration tank or catalytic oxidation tank.

9. The wastewater treatment apparatus according to claim 4, wherein the biological treatment tank has at least a catalytic oxidation tank, a filler made of a radial ring form is filled in this catalytic oxidation tank.

10. The wastewater treatment apparatus according to claim 9, wherein a material of the radial ring-shaped thread body is at least one of polyvinylidene chloride, polypropylene or vinylon.

11. The wastewater treatment apparatus of claim 4, wherein said biological treatment tank has a depth which is in the range of 4–5 times as great as the depth of said foaming tank.

12. A wastewater treatment method comprising steps of introducing wastewater into a biological treatment tank equipped with a submerged membrane and treating the wastewater, introducing sludge generated in the biological treatment tank into a foaming tank having a function of generating bubbles and treating the sludge, and returning the sludge treated in the foaming tank to the biological treatment tank.

13. The wastewater treatment method according to claim 12, wherein the wastewater is organic wastewater containing dimethylformamide.

14. The wastewater treatment method according to claim 12, wherein the wastewater is organic wastewater containing dimethylformamide, ammonium fluoride and tetramethylammonium formade.

15. A wastewater treatment apparatus which comprises a biological treatment tank having a submerged membrane, in which wastewater is treated by living organisms, and a foaming tank, into which sludge sedimented in the biological treatment tank is introduced and which has a function of generating air bubbles and treats and returns the sludge to the biological treatment tank.

16. The wastewater treatment apparatus according to claim 15, wherein an MLSS concentration of the returned sludge introduced into the foaming tank is 10000 ppm or higher.

17. The wastewater treatment apparatus according to claim 15, wherein sludge introduced into the foaming tank is:

sludge generated in a final part of a treatment process in the aeration tank or catalytic oxidation tank constituting the biological treatment tank, and sludge from the foaming tank is introduced in an initial part of the treatment process in the aeration tank or catalytic oxidation tank.

18. The wastewater treatment apparatus according to claim 15, wherein the wastewater is wastewater containing toxic chemical substances.

19. The wastewater treatment apparatus according to claim 15, wherein the wastewater is mixture wastewater of wastewater containing dimethylformamide and wastewater containing a developer.

20. The wastewater treatment apparatus according to claim 19, wherein development wastewater is organic wastewater containing tetramethylammonium hydroxide.

* * * * *